US012632167B2

(12) United States Patent
Zhang et al.

(10) Patent No.: US 12,632,167 B2
(45) Date of Patent: May 19, 2026

(54) SMART HANDWRITING DISPLAY DEVICE, SMART HANDWRITING DISPLAY METHOD, AND ELECTRONIC DEVICE

(71) Applicants:Beijing BOE Technology Development Co., Ltd., Beijing (CN); BOE Technology Group Co., Ltd., Beijing (CN)

(72) Inventors: Yangyang Zhang, Beijing (CN); Guangwei Huang, Beijing (CN); Yingjie Li, Beijing (CN); Yue Kong, Beijing (CN); Honglei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/290,834

(22) PCT Filed: Nov. 30, 2022

(86) PCT No.: PCT/CN2022/135675
§ 371 (c)(1),
(2) Date: Jan. 22, 2024

(87) PCT Pub. No.: WO2024/113271
PCT Pub. Date: Jun. 6, 2024

(65) Prior Publication Data
US 2025/0328233 A1 Oct. 23, 2025

(51) Int. Cl.
*G06F 3/0488* (2022.01)
*G06F 3/0354* (2013.01)
(Continued)

(52) U.S. Cl.
CPC ........ *G06F 3/0488* (2013.01); *G06F 3/03545* (2013.01); *G06F 3/0483* (2013.01);
(Continued)

(58) Field of Classification Search
CPC .. G06F 3/0488; G06F 3/03545; G06F 3/0483; G06F 3/0484; G06F 40/171;
(Continued)

(56) References Cited

U.S. PATENT DOCUMENTS

2020/0410222 A1* 12/2020 Chang ................. G06F 18/2413
2023/0315282 A1 10/2023 Yu
2024/0112485 A1* 4/2024 Kwak ................... G06V 30/22

FOREIGN PATENT DOCUMENTS

CN 104574467 A 4/2015
CN 104820563 A 8/2015
(Continued)

OTHER PUBLICATIONS

PCT/CN2022/135675 international search report dated Aug. 23, 2023.
(Continued)

*Primary Examiner* — Amit Chatly
(74) *Attorney, Agent, or Firm* — IPro, PLLC

(57) ABSTRACT

The present disclosure relates to a smart handwriting display device, a smart handwriting display method, and an electronic device. The method includes: obtaining information of handwriting of users; determining at least one handwriting group corresponding to the information of handwriting; and performing pagination on the at least one handwriting group, to obtain a respective subpage for each of the at least one handwriting group. In the embodiments the content of each handwriting group is written on the corresponding subpage, such that the content of different handwriting groups is isolated from each other, achieving the effect of
(Continued)

Control the display to display a handwriting application interface — 11

Obtain information of handwriting of a user and control the handwriting application interface to display the handwriting — 12

Determine at least one handwriting group corresponding to the information of handwriting, wherein each of the at least one handwriting group comprises at least one handwriting — 13

Perform pagination on the at least one handwriting group, to obtain a respective subpage for each of the at least one handwriting group — 14 keeping the display region clean and tidy, which is conducive to improving communication efficiency.

18 Claims, 9 Drawing Sheets

(51) Int. Cl.

| | |
|---|---|
| *G06F 3/0483* | (2013.01) |
| *G06F 3/0484* | (2022.01) |
| *G06F 40/103* | (2020.01) |
| *G06F 40/171* | (2020.01) |
| *G06F 40/186* | (2020.01) |
| *G06V 10/762* | (2022.01) |
| *G06V 30/32* | (2022.01) |

(52) U.S. Cl.
CPC .......... *G06F 3/0484* (2013.01); *G06F 40/171* (2020.01); *G06F 40/186* (2020.01); *G06V 10/762* (2022.01); *G06V 30/36* (2022.01); *G06F 40/103* (2020.01)

(58) Field of Classification Search
CPC ... G06F 40/186; G06F 40/103; G06V 10/762; G06V 30/36
See application file for complete search history.

(56) References Cited

FOREIGN PATENT DOCUMENTS

| | | | |
|---|---|---|---|
| CN | 105511792 | A | 4/2016 |
| CN | 108829327 | A | 11/2018 |
| CN | 110750501 | A | 2/2020 |
| CN | 111352570 | A | 6/2020 |
| CN | 114579032 | A | 6/2022 |
| CN | 115002084 | A | 9/2022 |
| EP | 3365764 | B1 | 8/2022 |
| JP | 2014142854 | A | 8/2014 |

OTHER PUBLICATIONS

PCT/CN2022/135675 Written Opinion dated Aug. 23, 2023.
EP22966862.9 extended European search report dated Jul. 30, 2025.

\* cited by examiner

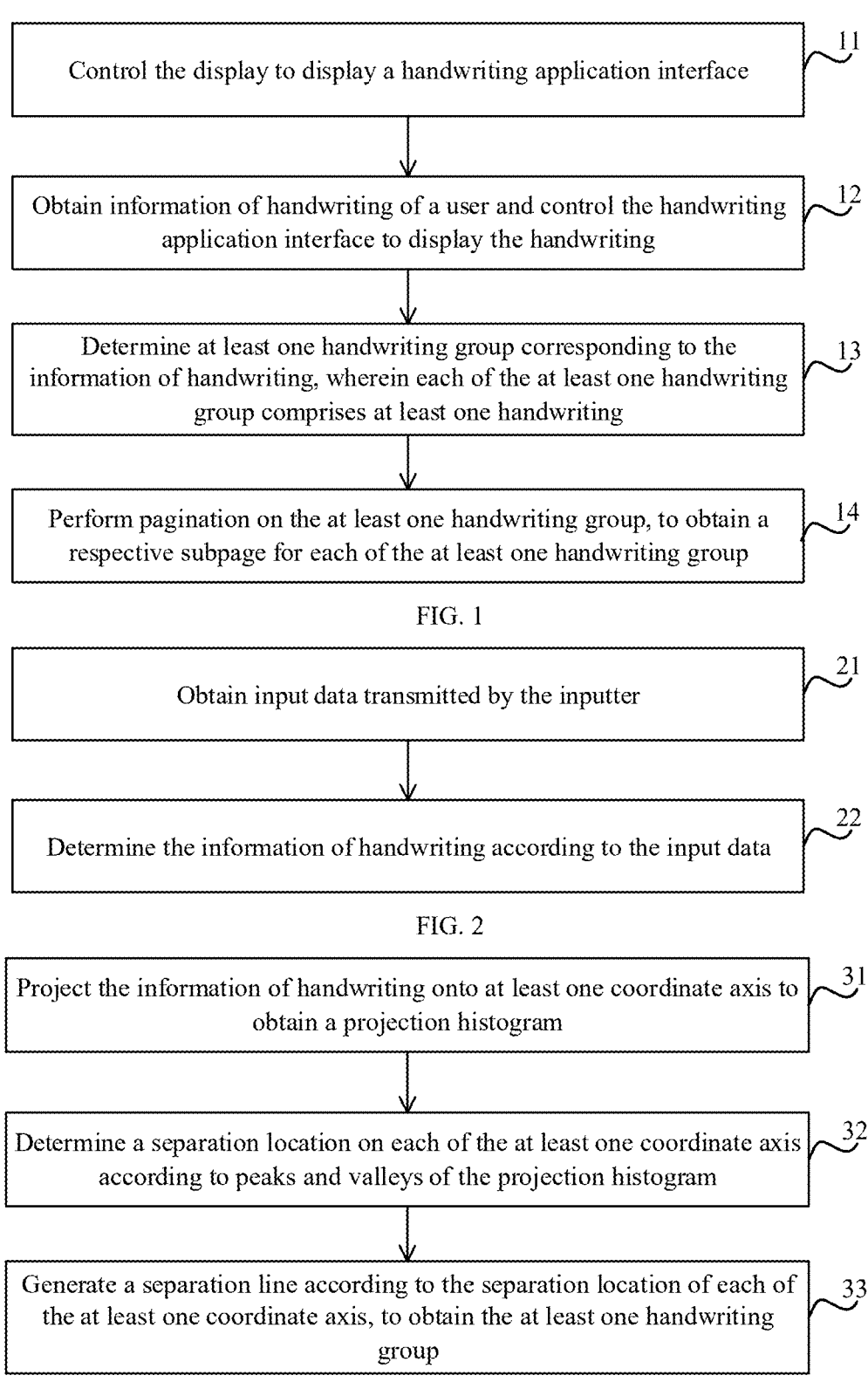

Control the display to display a handwriting application interface ~11

Obtain information of handwriting of a user and control the handwriting application interface to display the handwriting ~12

Determine at least one handwriting group corresponding to the information of handwriting, wherein each of the at least one handwriting group comprises at least one handwriting ~13

Perform pagination on the at least one handwriting group, to obtain a respective subpage for each of the at least one handwriting group ~14

FIG. 1

Obtain input data transmitted by the inputter ~21

Determine the information of handwriting according to the input data ~22

FIG. 2

Project the information of handwriting onto at least one coordinate axis to obtain a projection histogram ~31

Determine a separation location on each of the at least one coordinate axis according to peaks and valleys of the projection histogram ~32

Generate a separation line according to the separation location of each of the at least one coordinate axis, to obtain the at least one handwriting group ~33

FIG. 3

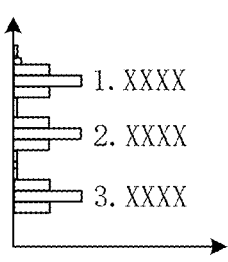
FIG. 4
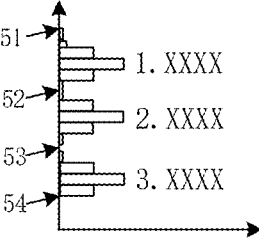
FIG. 5
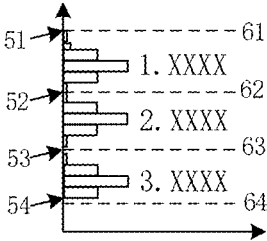
FIG. 6
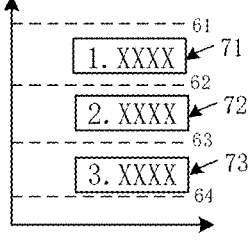
FIG. 7
Cluster handwriting points in the information of handwriting, to obtain a category to which each of the handwriting points belongs and multiple category centers ⟩ 81
Determine handwriting points of one category as a handwriting group, to obtain the at least one handwriting group ⟩ 82
FIG. 8

Obtain a bounding rectangle of each category's trajectory points to obtain at least one candidate handwriting group  ~91

Obtain candidate handwriting groups to which the center of gravity of each stroke of the information of handwriting belongs  ~92

When the candidate handwriting group to which the center of gravity of each stroke belongs is different from the candidate handwriting group corresponding to the cluster, adjust the category of stroke  ~93

Update the bounding rectangle of each candidate handwriting group to obtain at least one handwriting group  ~94

FIG. 9

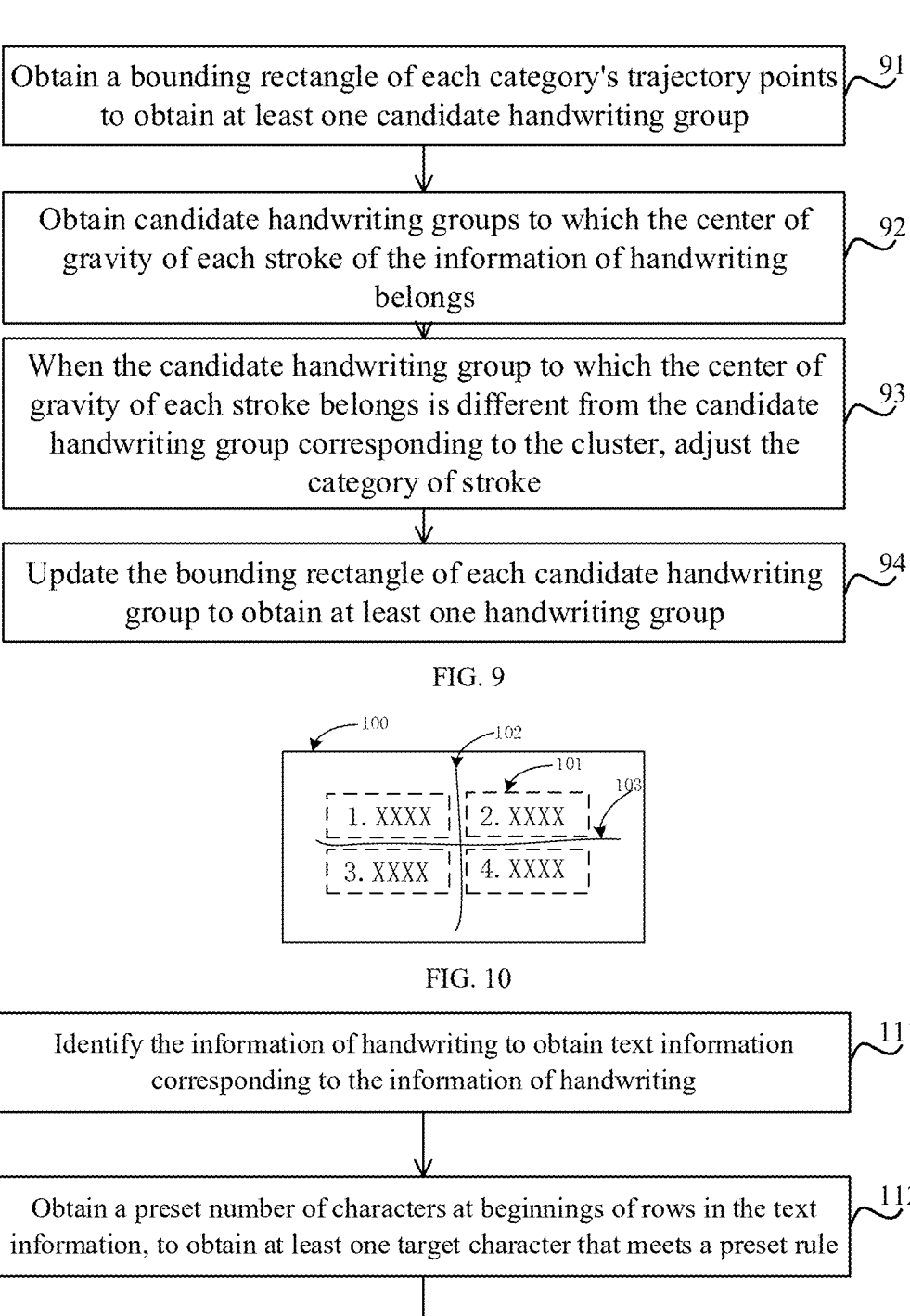

FIG. 10

Identify the information of handwriting to obtain text information corresponding to the information of handwriting  ~111

Obtain a preset number of characters at beginnings of rows in the text information, to obtain at least one target character that meets a preset rule  ~112

Divide at least one row of handwriting corresponding to each of the at least one target character into a handwriting group, to obtain the at least one handwriting group  ~113

FIG. 11

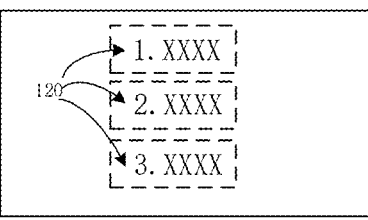

FIG. 12

| |
|---|
| Divide the information of handwriting into rows, to obtain multiple handwriting rows |

131

| |
|---|
| In response to detecting at least one line exceeding a preset length in the handwriting application interface, obtain a respective row of handwriting corresponding to each of the at least one line |

132

| |
|---|
| In response to detecting that a line connects two handwriting rows, merge the two handwriting rows to obtain a handwriting group; in response to detecting that a line passes through a handwriting row, divide the handwriting row into two handwriting groups |

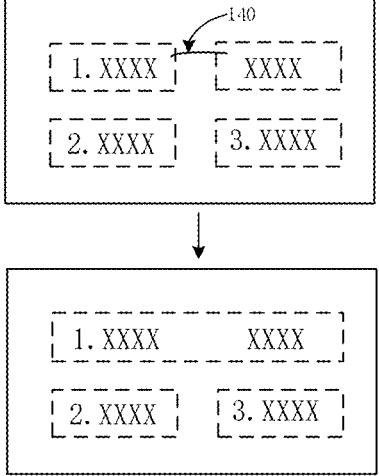

FIG. 14

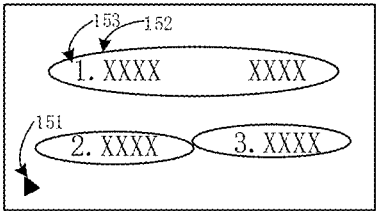

FIG. 15

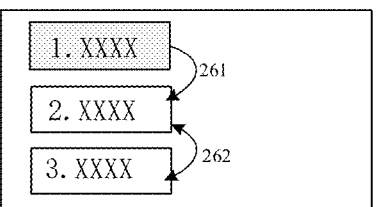

FIG. 26

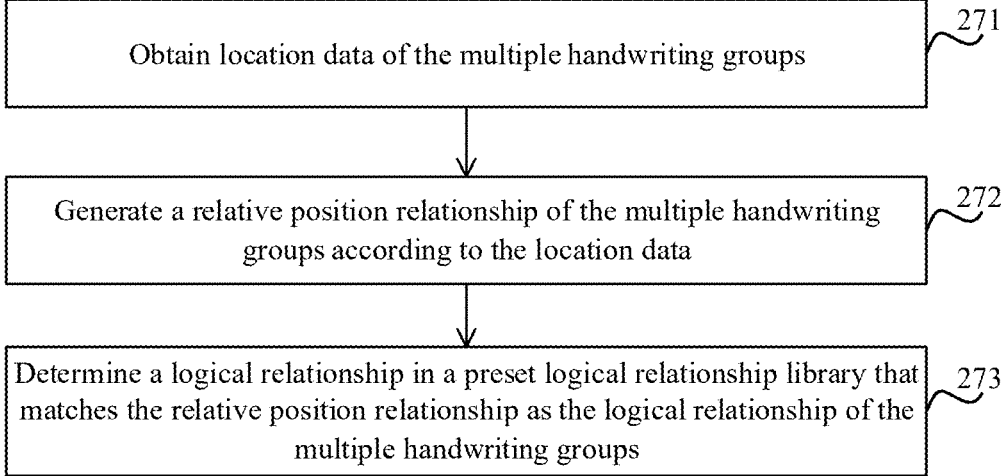

Obtain location data of the multiple handwriting groups 271

Generate a relative position relationship of the multiple handwriting groups according to the location data 272

Determine a logical relationship in a preset logical relationship library that matches the relative position relationship as the logical relationship of the multiple handwriting groups 273

FIG. 27

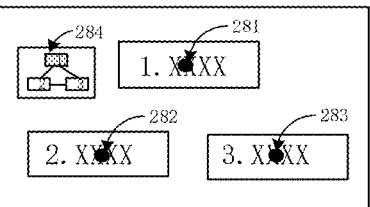

FIG. 28

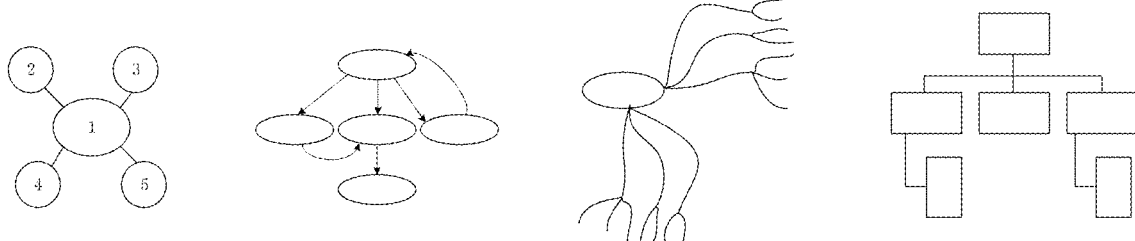

FIG. 29

SMART HANDWRITING DISPLAY DEVICE, SMART HANDWRITING DISPLAY METHOD, AND ELECTRONIC DEVICE

CROSS-REFERENCE TO RELATED APPLICATIONS

This application is a national stage of international PCT Application No. PCT/CN2022/135675 filed on Nov. 30, 2022, the entire contents of which are incorporated herein by reference.

TECHNICAL FIELD

The present disclosure relates to the field of data processing technology, particularly to a smart handwriting display device, a smart handwriting display method, and an electronic device.

BACKGROUND

Electronic whiteboards, also known as smart interactive tablets, smart handwriting display devices, or IWB (Interactive White Board), are widely used in communication scenarios. In meeting scenarios, users can use a stylus to write content on an electronic whiteboard. To achieve better communication effects, users can use a flowchart function of the electronic whiteboard to add or delete themes, subtopics, or next-level subtopics in a flowchart interface by clicking on the add or delete controls.

In practical applications, such as in many scenarios of brainstorming, users do not always know content of each topic in advance. They usually write a lot of content directly on the electronic whiteboard, such that a large amount of content exists on the electronic whiteboard, so the communicating content cannot be used well.

SUMMARY

The present disclosure provides a smart handwriting display device, a smart handwriting display method, and an electronic device to address the shortcomings of related technologies.

According to the first aspect of embodiments of the present disclosure, a smart handwriting display device is provided, and includes a display and one or more processors. The one or more processors are configured to:
control the display to display a handwriting application interface;
obtain information of handwriting of a user and control the handwriting application interface to display the handwriting;
determine at least one handwriting group corresponding to the information of handwriting, where each of the at least one handwriting group includes at least one handwriting; and
perform pagination on the at least one handwriting group, to obtain a respective subpage for each of the at least one handwriting group.

In some embodiments, the smart handwriting display device further includes an inputter, and the inputter is connected to the one or more processors;
where when obtaining the information of handwriting, the one or more processors are configured to:
obtain input data transmitted by the inputter, and determine the information of handwriting according to the input data.

In some embodiments, the inputter includes a touch component, where when obtaining the input data transmitted by the inputter, the one or more processors are configured to:
in response to a touch operation, obtain a data set of touch points collected by the touch component on a current page, to obtain the input data.

In some embodiments, the inputter includes a locator, where when obtaining the input data transmitted by the inputter, the one or more processors are configured to:
receive a data set of handwriting trajectory points of the user collected by the locator, and obtain the input data according to the data set of handwriting trajectory points.

In some embodiments, the inputter includes a communication component, and the communication component is connected to the one or more processors, where when obtaining the input data transmitted by the inputter, the one or more processors are configured to:
obtain a data set of touch points or data of handwriting image transmitted by a remote device through the communication component, to obtain the input data.

In some embodiments, the information of handwriting includes at least one of a data set of trajectory points, a data set of touch points, or a data set of pixel points.

In some embodiments, the data set of touch points includes at least one of original touch point data, interpolated touch point data, or sparsely sampled touch point data; and the data set of pixel points includes at least one of linewidth-adjusted pixel data or stroke-fitted pixel data.

In some embodiments, the data set of pixel points includes at least one of interpolated pixel data, sparsely sampled pixel data, linewidth-adjusted pixel data, or stroke-fitted pixel data.

In some embodiments, when determining the at least one handwriting group corresponding to the information of handwriting, the one or more processors are configured to:
group the information of handwriting to obtain the at least one handwriting group.

In some embodiments, grouping the information of handwriting includes automatically grouping the information of handwriting.

In some embodiments, when grouping the information of handwriting to obtain the at least one handwriting group, the one or more processors are configured to:
project the information of handwriting onto at least one coordinate axis to obtain a projection histogram;
determine a separation location on each of the at least one coordinate axis according to peaks and valleys of the projection histogram; and
generate a separation line according to the separation location of each of the at least one coordinate axis, to obtain the at least one handwriting group.

In some embodiments, when grouping the information of handwriting to obtain the at least one handwriting group, the one or more processors are configured to:
cluster handwriting points in the information of handwriting, to obtain a category to which each of the handwriting points belongs and multiple category centers; and
determine handwriting points of one category as a handwriting group, to obtain the at least one handwriting group.

In some embodiments, the clustering method includes a density-based clustering algorithm or a spectral clustering algorithm.

In some embodiments, when grouping the information of handwriting to obtain the at least one handwriting group, the one or more processors are configured to:

obtain strokes from the information of handwriting; and
 cluster each of the strokes in the information of handwriting, to obtain the at least one handwriting group.

In some embodiments, when grouping the information of handwriting to obtain the at least one handwriting group, the one or more processors are configured to:

divide the information of handwriting into rows, to obtain multiple handwriting rows; and
 cluster the multiple handwriting rows, to obtain the at least one handwriting group.

In some embodiments, after dividing the information of handwriting into rows, to obtain the multiple handwriting rows, the one or more processors are configured to:

in response to detecting that a handwriting row of the multiple handwriting rows is dragged to a region where another handwriting row are located, merge the two handwriting rows.

In some embodiments, when clustering the multiple handwriting rows, to obtain the at least one handwriting group, the one or more processors are configured to:

in a case where the at least one handwriting group includes multiple handwriting groups, in response to detecting that a handwriting group of the multiple handwriting groups is dragged to a region where another handwriting group are located, merge the two handwriting groups, to obtain the at least one handwriting group.

In some embodiments, grouping the information of handwriting includes grouping the information of handwriting in response to a drawn grouping figure.

In some embodiments, when grouping the information of handwriting to obtain the at least one handwriting group, the one or more processors are configured to:

in response to detection of the grouping figure in the handwriting application interface, group the information of handwriting according to the grouping figure to obtain the at least one handwriting group.

In some embodiments, the grouping figure includes a line, and when grouping the information of handwriting according to the grouping figure to obtain the at least one handwriting group, the one or more processors are configured to:

obtain at least one line exceeding a preset length in the handwriting application interface; and
 divide the information of handwriting according to the at least one line, to obtain the at least one handwriting group.

In some embodiments, the grouping figure includes a target character, and when grouping the information of handwriting according to the grouping figure to obtain the at least one handwriting group, the one or more processors are configured to:

group the information of handwriting according to a position relationship between the target character and the handwriting, to obtain the at least one handwriting group.

In some embodiments, grouping the information of handwriting according to the position relationship between the target character and the handwriting, to obtain the at least one handwriting group includes:

identifying the information of handwriting to obtain text information corresponding to the information of handwriting;

obtaining a preset number of characters at beginnings of rows in the text information, to obtain at least one target character that meets a preset rule; and
 dividing at least one row of handwriting corresponding to each of the at least one target character into a handwriting group, to obtain the at least one handwriting group.

In some embodiments, the grouping figure includes a line, and when grouping the information of handwriting according to the grouping figure to obtain the at least one handwriting group, the one or more processors are configured to:

divide the information of handwriting into rows, to obtain multiple handwriting rows; and
 in response to detecting at least one line exceeding a preset length in the handwriting application interface, obtain a respective row of handwriting corresponding to each of the at least one line;
 in response to detecting that a line connects two handwriting rows, merge the two handwriting rows to obtain a handwriting group; in response to detecting that a line passes through a handwriting row, divide the handwriting row into two handwriting groups.

In some embodiments, the one or more processors are further configured to:

generate a jump interface between a handwriting group and a subpage, where the jump interface includes at least one of a button, a link address, or a hyperlink; and
 in response to the jump interface being triggered, jump to the subpage corresponding to the handwriting group.

In some embodiments, when performing the pagination processing on the at least one handwriting group, to obtain the subpage corresponding to each of the at least one handwriting group, the one or more processors are configured to:

for each of the at least one handwriting group, copy a handwriting of the handwriting group; and
 paste the handwriting into the subpage corresponding to the handwriting group.

In some embodiments, when performing the pagination processing on the at least one handwriting group, to obtain the subpage corresponding to each of the at least one handwriting group, the one or more processors are configured to:

for each of the at least one handwriting group, identify the handwriting of the handwriting group and obtain text information; and
 paste the text information into the subpage corresponding to the handwriting group.

In some embodiments, when performing the pagination processing on the at least one handwriting group, to obtain the subpage corresponding to each of the at least one handwriting group, the one or more processors are configured to:

in response to detecting that a pagination control is triggered, obtain an inputted pagination figure; and
 perform the pagination on the at least one handwriting group according to the pagination figure, to obtain the subpage corresponding to each of the at least one handwriting group.

In some embodiments, the one or more processors are further configured to:

in a case where the at least one handwriting group includes multiple handwriting groups, obtain a logical relationship of the multiple handwriting groups; and
 generate a logical interface for displaying the logical relationship.

In some embodiments, the logical interface is configured to display in a main page or display in a reduced manner in a subpage.

In some embodiments, when obtaining the logical relationship of the multiple handwriting groups, the one or more processors are configured to:

in response to detecting that a pagination control is triggered, adjust the multiple handwriting groups to a logical editing state; and in response to detecting an operation that associates any two of the multiple handwriting groups, obtain the logical relationship of the multiple handwriting groups.

In some embodiments, when obtaining the logical relationship of the multiple handwriting groups, the one or more processors are configured to:

in response to detecting a preset indicating sign inputted by the user in the handwriting application interface, determine a relationship of at least two of the multiple handwriting groups corresponding to the preset indicating sign, to obtain the logical relationship of the multiple handwriting groups;

where the preset indicating sign includes at least one of a one-way arrow, a two-way arrow, a connecting line, a Chinese numeral, an Arabic numeral, an English letter, or a preset mnemonic.

In some embodiments, when obtaining the logical relationship of the multiple handwriting groups, the one or more processors are configured to:

obtain location data of the multiple handwriting groups;

generate a relative position relationship of the multiple handwriting groups according to the location data, where the relative position relationship includes at least one of surround, up and down, left and right, star, triangle, rectangle, pyramid, or tree; and determine a logical relationship in a preset logical relationship library that matches the relative position relationship as the logical relationship of the multiple handwriting groups.

In some embodiments, the one or more processors are further configured to:

obtain a recommended chart template according to the logical relationship; and in response to selecting a recommended chart template, generate a logical relationship.

In some embodiments, when obtaining the logical relationship of the multiple handwriting groups, the one or more processors are configured to:

obtain a preset chart template;

obtain location data and time data of the multiple handwriting groups; and match the preset chart template with the location data and the time data, to obtain the logical relationship of the multiple handwriting groups.

In some embodiments, the one or more processors are further configured to:

determine a logical relationship of the at least one handwriting group according to a partition figure.

In some embodiments, the one or more processors are further configured to:

process the subpage corresponding to each of the at least one handwriting group, to obtain a multimedia file in a designated format.

In some embodiments, the one or more processors are further configured to:

in response to detecting an input preset template, match content corresponding to each of the at least one handwriting group to the preset template, to obtain a multimedia file.

In some embodiments, the multimedia file in the designated format is a Word file, and when processing the subpage corresponding to each of the at least one handwriting group, to obtain the multimedia file in the designated format, the one or more processors are configured to:

create a blank Word document; and insert content of each of the at least one handwriting group and content of the subpage of each of the at least one handwriting group into the blank Word document, to obtain a target Word file.

In some embodiments, the multimedia file in the designated format is a webpage file, and when processing the subpage corresponding to each of the at least one handwriting group, to obtain the multimedia file in the designated format, the one or more processors are configured to:

set parameters of a webpage template based on each of the at least one handwriting group; and insert content of the subpage corresponding to each of the at least one handwriting group into a corresponding location of the webpage template, to obtain a target webpage file.

In some embodiments, the one or more processors are further configured to:

obtain a new element during a process of displaying the handwriting application interface;

in response to detecting that an insertion control of the handwriting application interface is operated through an auxiliary software, insert the new element into the handwriting application interface; and in response to detecting that an alignment control of the handwriting application interface is operated through an auxiliary software, align content in the handwriting application interface.

According to the second aspect of the embodiments of the present disclosure, a smart handwriting display method is provided, applied to a smart handwriting display device, where the smart handwriting display device includes a display and a processor, and the smart handwriting display method includes:

control the display to display a handwriting application interface;

obtaining information of handwriting of a user and controlling the handwriting application interface to display the handwriting;

determining at least one handwriting group corresponding to the information of handwriting, where each of the at least one handwriting group includes at least one handwriting; and performing pagination on the at least one handwriting group, to obtain a respective subpage for each of the at least one handwriting group.

In some embodiments, the information of handwriting includes at least one of a data set of trajectory points, a data set of touch points, or a data set of pixel points.

In some embodiments, the data set of touch points includes at least one of original touch point data, interpolated touch point data, or sparsely sampled touch point data; and the data set of pixel points includes at least one of linewidth-adjusted pixel data or stroke-fitted pixel data.

In some embodiments, determining the at least one handwriting group corresponding to the information of handwriting includes:

grouping the information of handwriting to obtain the at least one handwriting group.

In some embodiments, grouping the information of handwriting includes automatically grouping the information of handwriting.

In some embodiments, grouping the information of handwriting to obtain the at least one handwriting group includes:

projecting the information of handwriting onto at least one coordinate axis to obtain a projection histogram;

determining a separation location on each of the at least one coordinate axis according to peaks and valleys of the projection histogram; and generating a separation line according to the separation location of each of the at least one coordinate axis, to obtain the at least one handwriting group.

In some embodiments, grouping the information of handwriting to obtain the at least one handwriting group includes:

clustering handwriting points in the information of handwriting, to obtain a category to which each of the handwriting points belongs and multiple category centers; and determining handwriting points of one category as a handwriting group, to obtain the at least one handwriting group.

In some embodiments, the clustering method includes a density-based clustering algorithm or a spectral clustering algorithm.

In some embodiments, grouping the information of handwriting to obtain the at least one handwriting group includes:

obtaining strokes from the information of handwriting; and clustering each of the strokes in the information of handwriting, to obtain the at least one handwriting group.

In some embodiments, grouping the information of handwriting to obtain the at least one handwriting group includes:

dividing the information of handwriting into rows, to obtain multiple handwriting rows; and clustering the multiple handwriting rows, to obtain the at least one handwriting group.

In some embodiments, after dividing the information of handwriting into rows, to obtain the multiple handwriting rows, the method further includes:

in response to detecting that a handwriting row of the multiple handwriting rows is dragged to a region where another handwriting row are located, merging the two handwriting rows.

In some embodiments, clustering the multiple handwriting rows, to obtain the at least one handwriting group includes:

in a case where the at least one handwriting group includes multiple handwriting groups, in response to detecting that a handwriting group of the multiple handwriting groups is dragged to a region where another handwriting group are located, merging the two handwriting groups, to obtain the at least one handwriting group.

In some embodiments, grouping the information of handwriting includes grouping the information of handwriting in response to a drawn grouping figure.

In some embodiments, grouping the information of handwriting to obtain the at least one handwriting group includes:

in response to detection of the grouping figure in the handwriting application interface, grouping the information of handwriting according to the grouping figure to obtain the at least one handwriting group.

In some embodiments, the grouping figure includes a line, and grouping the information of handwriting according to the grouping figure to obtain the at least one handwriting group includes:

obtain at least one line exceeding a preset length in the handwriting application interface; and dividing the information of handwriting according to the at least one line, to obtain the at least one handwriting group.

In some embodiments, the grouping figure includes a target character, and grouping the information of handwriting according to the grouping figure to obtain the at least one handwriting group includes:

grouping the information of handwriting according to a position relationship between the target character and the handwriting, to obtain the at least one handwriting group.

In some embodiments, grouping the information of handwriting according to the position relationship between the target character and the handwriting, to obtain the at least one handwriting group includes:

identifying the information of handwriting to obtain text information corresponding to the information of handwriting;

obtaining a preset number of characters at beginnings of rows in the text information, to obtain at least one target character that meets a preset rule; and dividing at least one row of handwriting corresponding to each of the at least one target character into a handwriting group, to obtain the at least one handwriting group.

In some embodiments, the grouping figure includes a line, and grouping the information of handwriting according to the grouping figure to obtain the at least one handwriting group includes:

dividing the information of handwriting into rows, to obtain multiple handwriting rows; and in response to detecting at least one line exceeding a preset length in the handwriting application interface, obtaining a respective row of handwriting corresponding to each of the at least one line;

in response to detecting that a line connects two handwriting rows, merging the two handwriting rows to obtain a handwriting group; in response to detecting that a line passes through a handwriting row, dividing the handwriting row into two handwriting groups.

In some embodiments, the grouping figure is hand drawn.

In some embodiments, the method further includes:

generating a jump interface between a handwriting group and a subpage, where the jump interface includes at least one of a button, a link address, or a hyperlink; and in response to the jump interface being triggered, jumping to the subpage corresponding to the handwriting group.

In some embodiments, performing the pagination processing on the at least one handwriting group, to obtain the subpage corresponding to each of the at least one handwriting group includes:

for each of the at least one handwriting group, copying a handwriting of the handwriting group; and pasting the handwriting into the subpage corresponding to the handwriting group.

In some embodiments, performing the pagination processing on the at least one handwriting group, to obtain the subpage corresponding to each of the at least one handwriting group includes:

for each of the at least one handwriting group, identifying the handwriting of the handwriting group and obtain text information; and pasting the text information into the subpage corresponding to the handwriting group.

In some embodiments, performing the pagination processing on the at least one handwriting group, to obtain the subpage corresponding to each of the at least one handwriting group includes:

in response to detecting that a pagination control is triggered, obtaining an inputted pagination figure; and performing the pagination on the at least one handwriting group according to the pagination figure, to obtain the subpage corresponding to each of the at least one handwriting group.

In some embodiments, the method further includes:

in a case where the at least one handwriting group includes multiple handwriting groups, obtaining a logical relationship of the multiple handwriting groups; and generating a logical interface for displaying the logical relationship.

In some embodiments, the logical interface is configured to display in a main page or display in a reduced manner in a subpage.

In some embodiments, obtaining the logical relationship of the multiple handwriting groups includes:

in response to detecting that a pagination control is triggered, adjusting the multiple handwriting groups to a logical editing state; and in response to detecting an operation that associates any two of the multiple handwriting groups, obtain logical relationship of the multiple handwriting groups.

In some embodiments, obtaining the logical relationship of the multiple handwriting groups includes:

in response to detecting a preset indicating sign inputted by the user in the handwriting application interface, determining a relationship of at least two of the multiple handwriting groups corresponding to the preset indicating sign, to obtain the logical relationship of the multiple handwriting groups;

where the preset indicating sign includes at least one of a one-way arrow, a two-way arrow, a connecting line, a Chinese numeral, an Arabic numeral, an English letter, or a preset mnemonic.

In some embodiments, obtaining the logical relationship of the multiple handwriting groups includes:

obtaining location data of the multiple handwriting groups;

generating a relative position relationship of the multiple handwriting groups according to the location data, where the relative position relationship includes at least one of surround, up and down, left and right, star, triangle, rectangle, pyramid, or tree; and determining a logical relationship in a preset logical relationship library that matches the relative position relationship as the logical relationship of the multiple handwriting groups.

In some embodiments, the method further includes:

obtaining a recommended chart template according to the logical relationship; and in response to selecting a recommended chart template, generating a logical relationship.

In some embodiments, obtaining the logical relationship of the multiple handwriting groups includes:

obtaining a preset chart template;

obtaining location data and time data of the multiple handwriting groups; and matching the preset chart template with the location data and the time data, to obtain the logical relationship of the multiple handwriting groups.

In some embodiments, the method further includes:

determining a logical relationship of the at least one handwriting group according to a partition figure.

In some embodiments, the method further includes:

processing the subpage corresponding to each of the at least one handwriting group, to obtain a multimedia file in a designated format.

In some embodiments, the method further includes:

in response to detecting an input preset template, matching content corresponding to each of the at least one handwriting group to the preset template, to obtain a multimedia file.

In some embodiments, the multimedia file in the designated format is a webpage file, and processing the subpage corresponding to each of the at least one handwriting group includes:

create a blank Word document; and inserting content of each of the at least one handwriting group and content of the subpage of each of the at least one handwriting group into the blank Word document, to obtain a target Word file.

In some embodiments, the multimedia file in the designated format is a webpage file, and processing the subpage corresponding to each of the at least one handwriting group, to obtain the multimedia file in the designated format includes:

setting parameters of a webpage template based on each of the at least one handwriting group; and inserting content of the subpage corresponding to each of the at least one handwriting group into a corresponding location of the webpage template, to obtain a target webpage file.

In some embodiments, the method further includes:

obtaining a new element during a process of displaying the handwriting application interface;

in response to detecting that an insertion control of the handwriting application interface is operated through auxiliary software, inserting the new element into the handwriting application interface; and in response to detecting that an alignment control of the handwriting application interface is operated through auxiliary software, aligning content in the handwriting application interface.

According to the third aspect of the embodiments of the present disclosure, a smart handwriting display apparatus is provided, applied to a smart handwriting display device, where the smart handwriting display device includes a display and a processor, and the smart handwriting display apparatus includes:

a handwriting interface display module, configured to control the display to display a handwriting application interface;

a handwriting display module, configured to obtain information of handwriting of a user and control the handwriting application interface to display the handwriting;

a handwriting group determining module, configured to determine at least one handwriting group corresponding to the information of handwriting, where each of the at least one handwriting group includes at least one handwriting; and a handwriting group pagination module, configured to perform pagination on the at least one handwriting group, to obtain a respective subpage for each of the at least one handwriting group.

According to the fourth aspect of embodiments of the present disclosure, an electronic device is provided, including:

a display;

one or more processors;

one or more memories for storing a computer program that can be executed by the one or more processors;

where the one or more processors are configured to execute computer programs in the one or more memory to implement the method mentioned above.

According to the fifth aspect of embodiments of the present disclosure, a computer-readable storage medium is provided, where when an executable computer program in the storage medium is executed by a processor, the method mentioned above.

The technical solutions provided by the embodiments of the present disclosure can include following beneficial effects.

As can be seen from the above embodiments, the solution provided in the embodiments of the present disclosure can control the display to display a handwriting application interface; obtain information of handwriting of a user and control the handwriting application interface to display the handwriting; then, determine at least one handwriting group corresponding to the information of handwriting, where a handwriting group includes at least one handwriting; finally, perform pagination on the at least one handwriting group to obtain the subpage for each handwriting group. In this way, the embodiments write the content of each handwriting group on the corresponding subpage, such that the content of different handwriting groups is isolated from each other, achieving the effect of keeping the display region clean and tidy, which is conducive to improving communication efficiency.

It is to be understood that the above general descriptions and the below detailed descriptions are merely exemplary and explanatory, and are not intended to limit the present disclosure.

BRIEF DESCRIPTION OF DRAWINGS

Accompanying drawings herein are incorporated into and constitute a part of the specification, illustrate embodiments consistent with the present disclosure, and are combined with the description to explain the principle of the present disclosure.

FIG. 1 is a flowchart of an information processing method according to an exemplary embodiment.

FIG. 2 is a flowchart for obtaining information of handwriting according to an exemplary embodiment.

FIG. 3 is a flowchart for obtaining a handwriting group according to an exemplary embodiment.

FIG. 4 is a schematic diagram of a projection histogram according to an exemplary embodiment.

FIG. 5 is a schematic diagram of a segmentation position according to an exemplary embodiment.

FIG. 6 is a schematic diagram of a segmentation line according to an exemplary embodiment.

FIG. 7 is a schematic diagram of a handwriting group according to an exemplary embodiment.

FIG. 8 is a flowchart for obtaining a handwriting group according to an exemplary embodiment.

FIG. 9 is a flowchart for obtaining a handwriting group according to an exemplary embodiment.

FIG. 10 is a schematic diagram of a line partitioning according to an exemplary embodiment.

FIG. 11 is a flowchart for obtaining a handwriting group according to an exemplary embodiment.

FIG. 12 is a schematic diagram of a target symbol according to an exemplary embodiment.

FIG. 13 is a flowchart for obtaining a handwriting group according to an exemplary embodiment.

FIG. 14 is a schematic diagram of merging two handwriting lines according to an exemplary embodiment.

FIG. 15 is a schematic diagram of a triangular-form pagination control according to an exemplary embodiment.

FIG. 26 is a schematic diagram for creating a logical relationship using a preset indicating identifier according to an exemplary embodiment.

FIG. 27 is a flowchart for obtaining a logical relationship according to an exemplary embodiment.

FIG. 28 is a schematic diagram for determining a logical relationship of handwriting groups through location data according to an exemplary embodiment.

FIG. 29 is a schematic diagram of four recommended chart templates according to an exemplary embodiment.

DETAILED DESCRIPTION

Figures 16, 17, 18:
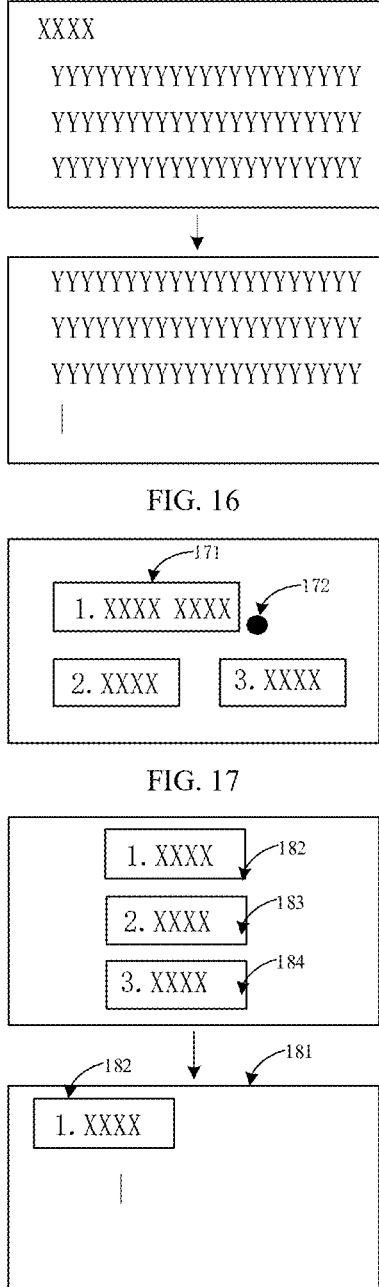
FIG. 16 is a schematic diagram for moving subpage according to an exemplary embodiment.
FIG. 17 is a schematic diagram of a button and a hyperlink according to an exemplary embodiment.
FIG. 18 is a schematic diagram for jumping to a subpage according to an exemplary embodiment.

Embodiments will be described in detail herein, examples of which are illustrated in the accompanying drawings. Where the following description refers to the drawings, elements with the same numerals in different drawings refer to the same or similar elements unless otherwise indicated. Embodiments described in the illustrative examples below are not intended to represent all embodiments consistent with the present disclosure. Rather, they are merely embodiments of devices consistent with some aspects of the present disclosure as recited in the appended claims. It should be noted that, without conflict, features in following embodiments can be combined with each other.

To address the aforementioned technical problems, the embodiments of the present disclosure provide an information processing method that can be applied to devices such as smart handwriting display devices and electronic whiteboards. For the convenience of description, the solution of each embodiment will be described with the smart handwriting display device as an execution subject in the following. The smart handwriting display device includes a processor (System on Chip, SOC), a display component, a touch component, and a communication component. The processor is installed with an operating system such as Android, Kirin, or Windows, and various application software can be installed to achieve various functions such as office work, conferencing, etc. For example, a handwriting software app can be installed to achieve handwriting function, allowing users to write and annotate on the display screen during meetings. The display component can include a display screen. The size of the play screen is usually larger than 50 inches, such as 55, 65, 75, 86, 98, 110 inches, etc., which meets the needs of multi-user meetings for viewing. The touch component can include at least one of an infrared touch, a capacitive touch, or an electromagnetic touch, that is used for detecting signals such as handwriting and user interaction. The communication component can include but are not limited to communication modules such as WiFi and Bluetooth, that are used to support wireless screen projection and Bluetooth connections with other devices. Moreover, the communication component is further used for the communication connection between the smart handwriting display device and cloud servers, where the cloud services play a role in AI supported functions, e.g., implementing AI functions in the cloud.

The smart handwriting display device is equipped with handwriting software. This handwriting software supports handwriting with a stylus (active stylus or passive stylus), a finger, or other devices. The touch component or a remote connected mobile device can obtain handwriting touch trajectory points and downsample touch trajectory points. Then, according to the touch trajectory points, handwriting fitting is performed, for example, the Bessel curve can be used for handwriting smoothing, and the handwriting line width can be adjusted and the stroke can be simulated according to the speed or pressure. Then, the processor controls the display screen to display the handwriting. The process of generating handwriting for the operating system can refer to relevant techniques.

In addition, the smart handwriting display device can further achieve wireless screen projection and remote video conferencing functions with remote devices such as mobile terminals, personal computers, and other smart handwriting display devices.

FIG. 1 is a block diagram of a smart handwriting display device according to an exemplary embodiment. Referring to FIG. 1, a smart handwriting display device includes a display and a processor. The processor is used to perform steps 11 to 14.

In step 11, the display is controlled to display a handwriting application interface.

In this embodiment, the processor communicates with the display to generate the handwriting application interface and send the handwriting application interface to the display to control the display to display the handwriting application interface. In this case, users can write within the aforementioned handwriting application interface, for example, using the aforementioned stylus to write handwriting groups and other content within the handwriting application interface.

In step 12, information of handwriting is obtained and the handwriting application interface is controlled to display the handwriting.

In this embodiment, as shown in FIG. 2, in step 21, the processor of the smart handwriting display device can obtain input data transmitted by the inputter. In step 22, the processor can determine the information of handwriting of the user according to the input data.

In the embodiment, the smart handwriting display device further includes an inputter, and the inputter is connected to the one or more processors. The processor can communicate with the inputter to obtain the input data transmitted by the inputter.

In an example, the inputter is a touch component that can collect a data set of touch points within a current page in response to a user's triggering operation, and transmit the data set of touch points to the processor. In this way, the processor can retrieve the input data.

In an example, the inputter is a touch device that can detect a location of the triggering, record the coordinate data of the touch point, and also record the time data of the touch point. In this case, the inputter is a touch component that can collect a data set of touch points within a current page in response to a user's triggering operation, and transmit the data set of touch points to the processor. In this way, the processor can retrieve the input data. It is understandable that in this case, the input data can include original touch point data. The touch point data includes coordinate data and/or time data. In this way, the processor can retrieve the input data.

In another example, the smart handwriting display device includes a communication component such as a WiFi module, a Bluetooth module, or a GPRS module. The communication component is connected to the processor. Moreover, the smart handwriting display device can communicate with a corresponding communication component in the mobile terminal through this communication component. The Mobile terminal includes a touch device. When the user performs touch operation on the display screen of the mobile terminal, the inputter is a touch device that can detect a location of the triggering, record the coordinate data of the touch point, and also record the time data of the touch point. When the smart handwriting display device communicates with the mobile terminal, the processor of the smart handwriting display device can obtain a data set of touch points or handwriting image data transmitted by the mobile terminal, that is, the data set of touch points includes touch data of multiple touch points collected by the touch device of the mobile terminal. The touch data includes coordinate data and/or time data, or handwriting image data collected by the mobile terminal. Then, the processor can use the data set of touch points mentioned above as input data. In this way, in this embodiment, there is no need for users to write on the smart handwriting display device. Each user can write through their own mobile terminal and display on the smart handwriting display device, which is suitable for scenarios where multiple users communicate in meetings and can improve writing efficiency.

In another example, the smart handwriting display device includes a communication component, such as a wireless module such as a Wi-Fi module, a Bluetooth module, or a GPRS module, or a wired module. The smart handwriting display device can communicate with a corresponding communication component in a personal computer through the communication component. The personal computer includes an inputter such as a mouse, through which the movement trajectory of the cursor can be adjusted. When the user moves or operates the inputter, the cursor moves within the display region. In this case, the personal computer can record the coordinate data of the cursor and also record the time data when the cursor reaches that position. When the smart handwriting display device communicates with a personal computer, the processor of the smart handwriting display device can obtain a data set of touch points transmitted by the personal computer, which includes movement data of multiple trajectory points of the cursor detected by the personal computer in the display region, including the coordinate data and/or time data of the cursor. The processor can use the data set of touch points mentioned above as input data. Similarly, the processor can also obtain handwriting image data transmitted by the personal computer through the communication component, thereby inputting data. In this way, in this embodiment, there is no need for users to write on the smart handwriting display device. Each user can write through their own personal computer and display on the smart handwriting display device, which is suitable for scenarios where multiple users communicate in meetings and can improve writing efficiency.

In another example, the smart handwriting display device can be interconnected with multiple smart handwriting display devices through the communication component. For ease of description, other smart handwriting display devices interconnected with the smart handwriting display device are referred to as peer smart handwriting display devices. The peer smart handwriting display devices can be set up in the remote conference room during remote meetings. It is understandable that the configuration of the smart handwriting display device is the same as that of the peer smart handwriting display devices. When a user writes on a peer smart handwriting display device, the touch device of the device can detect the triggering position, record the coordinate data of the touch point, and also record the time data of the touch point. In this case, the processor of the peer smart handwriting display device can obtain the data set of touch points collected by the aforementioned touch device on the current page. The data set of touch points includes touch data from multiple touch points collected by the touch device, including coordinate data and/or time data. When the smart handwriting display device are interconnected with the peer smart handwriting display devices, the processor of the smart handwriting display device can obtain touch point data shared by the peer smart handwriting display devices. Then, the processor of the smart handwriting display device takes the data set of touch points mentioned above as input data. In this way, in this embodiment, users in different geographical locations can write on their respective smart handwriting display devices and share them with other connected smart handwriting display devices. This is suitable for scenarios where multiple users communicate in remote conferences, because all users watch the same content together, which can improve communication efficiency.

It should be noted that the above-mentioned mobile terminal, personal computer, and shared multiple conference all-in-one machines can be collectively referred to as remote devices to distinguish them from the smart handwriting display device that displays the handwriting application interface.

In another example, the smart handwriting display device may include a locator, which may include but is not limited to a camera (such as a depth camera) or a radar (such as a millimeter wave radar). Taking the locator as a camera as an example, the camera can capture images within a preset range and determine the position of the user's hand through the images. Identifying the user's hand and locating its position can be achieved using a neural network model. The camera can continuously capture several frames of images to obtain the positions of the user's hand at different positions, and determine the user's aerial writing gestures based on the above positions. The processor can receive a set data of handwriting trajectory points collected by the locator, and obtain input data based on the data set of handwriting trajectory points. In this way, in this embodiment, users can write content in the air, which can improve writing efficiency.

Based on the above examples, it can be seen that information of handwriting can include at least one of a data set of trajectory points, a data set of touch points, or a data set of pixel points. In an example, the data set of trajectory points may include trajectory point data from locators such as cameras and radars. The data set of touch points can include touch point data collected locally or transmitted by remote devices. The data set of pixel points can include the pixels of handwriting images generated based on trajectory point data and touch point data.

For example, the processor can interpolate (including location data interpolation and time data interpolation) the original touch point data, such as linear interpolation, quadratic interpolation, etc., to obtain several interpolated touch point data on the basis of the original touch points, achieving the effect of expanding touch point data. For example, the processor can perform sparse sampling on the original touch point data, thus, the sparsely sampled touch point data is obtained based on the original touch points. It is understandable that trajectory point data can be processed using the same interpolation or sparse sampling method as touch point data to increase or decrease trajectory points, achieving the effect of adjusting the number of trajectory points. For example, after determining the stroke based on the original touch point data, the processor can adjust the line width of the stroke, such as thickening or thinning, to obtain pixel data after line width adjustment. For example, after determining the stroke based on the original touch point data, the processor can perform stroke fitting on the stroke, such as thickening or thinning, to obtain stroke-fitted pixel data. In this way, in this embodiment, by expanding or reducing data, for example, long horizontal strokes of Chinese characters are fitted into silkworm heads and swallowtails, and corresponding pixel data are increased or decreased accordingly, thereby meeting the needs of different scenarios and improving the user experience.

It should be noted that the processor can further perform anti-aliasing, smoothing, curve fitting and other processing on handwriting, and can select a solution for processing handwriting according to specific scenarios, and the corresponding solution falls within the scope of the present disclosure.

In this embodiment, after determining the information of handwriting of the user, the processor can control the display screen to display the handwriting on the handwriting application interface, thereby facilitating the user's viewing of the information of handwriting.

In step 13, at least one handwriting group corresponding to the information of handwriting is determined, where each of the at least one handwriting group includes at least one handwriting.

In this embodiment, the smart handwriting display device can determine at least one handwriting group corresponding to the information of handwriting. For example, the processor can group the information of handwriting to obtain the at least one handwriting group. In an example, the processor can perform grouping based on the trajectory points in the information of handwriting. In an example, the processor can perform grouping based on touch points in information of handwriting. In an example, the processor can perform grouping based on the pixels in the information of handwriting. In an example, the processor can perform grouping based on touch points or trajectory points in the information of handwriting, and group pixels based on the correspondence between touch points or trajectory points and pixels.

In this embodiment, the grouping processing method of the processor includes automatic grouping and grouping in response to the grouping graph drawn by the user.

In an example, automatic grouping includes projection methods. Referring to FIG. 3, in step 31, the processor can project the information of handwriting onto at least one coordinate axis to obtain a projection histogram. Refer to FIG. 4, which illustrates the effect of the projection histogram obtained by projecting on the Y-axis. In step 32, the processor can determine a separation location on each of the at least one coordinate axis according to peaks and valleys of the projection histogram. Referring to FIG. 5, the separation locations 51, 52, 53, and 54 can be determined based on the projected histogram. In step 33, the processor can generate a separation line according to the separation location of each of the at least one coordinate axis, to obtain the at least one handwriting group. Referring to FIG. 6, the processor determines the separation lines 61, 62, 63, and 64 based on the separation locations 51, 52, 53, and 54, respectively. The separation lines 61 and 62 can determine the first handwriting group, the separation lines 62 and 63 can determine the second handwriting group, and the separation lines 63 and 64 can determine the third handwriting group, obtaining a total of three handwriting groups. It is understandable that the processor can determine the handwriting in each handwriting group based on the maximum and minimum values of the trajectory points in the information of handwriting between adjacent separation lines. The effect is shown in FIG. 7, which illustrates handwriting groups 71, 72, and 73. In this way, this example can be applied to the scenario of writing text according to running script.

In another example, automatic grouping involves using clustering methods. Referring to FIG. 8, in step 81, the processor can cluster handwriting points of the information of handwriting, to obtain a category to which each of the handwriting points belongs and multiple category centers. The clustering method can include a density-based clustering algorithm or a spectral clustering algorithm. Density-based clustering algorithms can define clusters as the maximum set of density connected points, divide regions with sufficient high density into clusters, and discover clusters of any shape in spatial databases. The spectral clustering algorithm defines an affinity matrix that describes the similarity between paired data points based on a given sample dataset, calculates the eigenvalues and eigenvectors of the matrix, and then selects appropriate eigenvectors to cluster different data points. Technicians can also choose appropriate clustering algorithms based on specific scenarios, and in scenarios where touch points can be classified, the corresponding solutions fall within the scope of protection of the present disclosure. In step 82, the processor can determine handwriting points of one category as a handwriting group, to obtain the at least one handwriting group. In this way, the information of handwriting can be divided into handwriting groups through clustering in this example, which is suitable for scenarios with sparse information of handwriting. The scheme is simple and easy to implement.

In another example, in step 82, the processor determining handwriting points of one category as a handwriting group, to obtain the at least one handwriting group, as shown in FIG. 9, includes steps 91 to 94. In step 91, the processor can obtain a bounding rectangle of each category's trajectory points to obtain at least one candidate handwriting group. For example, for each category of trajectory points, the processor can obtain the outermost touch points in the four directions of up, down, left, and right, and then generate a bounding rectangle based on the above four touch points. Alternatively, the processor can take the cluster center of each category as the center point of the rectangle and adjust the length and/or width of the rectangle until it exactly covers all touch points of that category, to obtain the bounding rectangle of that category. It is understandable that a candidate handwriting group can be obtained by obtaining a bounding rectangle.

In step 92, the processor can obtain candidate handwriting groups to which the center of gravity of each stroke of the information of handwriting belongs. After obtaining each stroke, the processor can obtain the center of gravity of each stroke. The abscissa of the center of gravity is the average of the abscissas of all touch points, and the ordinate of the center of gravity is the average of the ordinates of all touch points. After obtaining the center of gravity of each stroke, the processor can determine the region where the center of gravity is located, which is the candidate handwriting group to which the center of gravity belongs.

In step 93, when the candidate handwriting group to which the center of gravity of each stroke belongs is different from the candidate handwriting group corresponding to the cluster, the processor can adjust the category of stroke. When the candidate handwriting group to which the center of gravity of each stroke belongs is different from the candidate handwriting group corresponding to the cluster, that is, the center of gravity of the stroke is located in one handwriting group, and some points of the stroke are located in other category, the processor can adjust the category of stroke, that is, adjust the category of all touch points of the stroke to the candidate handwriting group where the center of gravity is located.

In step 94, the processor can update the bounding rectangle of each candidate handwriting group to obtain at least one handwriting group. After updating the candidate handwriting groups to which each stroke belongs, the touch points within the candidate handwriting groups also change. In this case, the processor can update the bounding rectangle of each candidate handwriting group to obtain at least one handwriting group. In this way, adjusting the bounding rectangle by the center of gravity of the stroke can prevent noise caused by clustering operations and improve the accuracy of handwriting groups.

In another example, in step 82, the processor can obtain a bounding rectangle of each category's trajectory points to obtain at least one handwriting group. For example, a processor can cluster each stroke in information of handwriting, treating each cluster as a handwriting group, thereby obtaining at least one handwriting group. In this way, in this example, clustering strokes can be clustering strokes into text, words, or sentences. As the granularity of clustering increases, it can improve clustering efficiency and accuracy.

In another example, in step 82, the processor obtaining a bounding rectangle of each category's trajectory points to obtain at least one handwriting group includes: the processor dividing information of handwriting into rows, where dividing into rows can be achieved through projection to obtain multiple handwriting rows. Then, the processor can cluster the multiple handwriting rows, which is beneficial for segmenting handwriting belonging to the same paragraph. Each handwriting paragraph corresponds to a handwriting group, thereby obtaining at least one handwriting group. In this way, using handwriting rows as clustering objects in this example increases their granularity, which can reduce clustering data and improve clustering efficiency and accuracy.

It should be noted that considering the possible deviation in handwriting row division, the processor can display the bounding rectangle of each handwriting row on the display screen. When a deviated handwriting row is found, the user can drag the handwriting row to the region where another handwriting row is located, causing overlap between the two handwriting rows. In this case, the processor can merge the two handwriting rows to obtain a new handwriting row. In this way, by merging handwriting rows in this example, the accuracy of dividing handwriting groups can be improved.

It should be noted that considering the possible deviation in handwriting group division, the processor can display the bounding rectangle of each handwriting row on the display screen. When a deviated stroke group is found, the user can drag the stroke group to the region where another stroke group is located, causing overlap between the two stroke groups. In this case, the processor can merge the two stroke groups to obtain a new stroke group. In this way, by merging the two handwriting groups in this example, the accuracy of dividing handwriting groups can be improved.

In this embodiment, the processor can perform grouping in response to the grouping figure drawn by the user. For example, in response to the detection of the grouping figure within the handwriting application interface, the processor can group the information of handwriting based on the grouping figure to obtain at least one handwriting group. The grouping figure can be the figure input by the user through the inputter, or the figure manually drawn by the user, such as lines, triangles, rectangles, trees, pyramids, and so on.

In an example, the processor can perform object detection and recognize grouping figure on the handwriting application interface through a CNN neural network. RNN neural networks such as LSTM can also be used to detect the handwriting trajectory points and obtain grouping figure for handwriting input. In some embodiments, other recognition methods may be employed, such as graphic recognition based on information such as the number of turning points between handwritten trajectory points input by the user and the slope of the lines before and after the turning points, to obtain at least one handwriting group.

In an example, the grouping figure includes at least one line, and the processor can group the information of handwriting to obtain at least one handwriting group, including: the user can draw lines within the display region of the smart handwriting display device. Considering that the lines drawn by users when dividing groups are usually longer than the size of the text, the processor can obtain at least one line within the display region of the smart handwriting display device that exceeds the preset length (such as 1.6-3 times the line spacing). The line can be at least one line segment, at least one curved line segment, or a shape formed by curved line segments, such as a triangle, mouth shape, circle, etc. Then, the processor can divide the information of handwriting according to the at least one line, to obtain the at least one handwriting group. Referring to FIG. 10, the display region 100 of the smart handwriting display device includes two lines, namely vertical line 102 and horizontal line 103. The vertical line 102 and horizontal line 103 divide the handwriting application interface into four regions, resulting in four handwriting groups 101.

In another example, the grouping figure includes a target character. In step 82, the processor may group the information of handwriting based on the grouping figure to obtain at least one handwriting group. For example, grouping the information of handwriting based on the position relationship between the target character and the handwriting to obtain at least one handwriting group. Referring to FIG. 11, it includes steps 111 to 113.

In step 111, the processor can recognize and process handwriting note information to obtain the text information corresponding to the information of handwriting. Text recognition can be achieved using networks such as convolutional neural networks CNN or recurrent neural networks RNN, which is not limited. In step 112, the processor can obtain a preset number of characters at beginnings of rows in the text information, to obtain at least one target character that meets a preset rule. The preset number can be 1-5. The preset rule can be set according to specific scenarios, such as numerical order, alphabetical order, etc. The target character can refer to Arabic numerals with the preset rule (such as arranged in order), such as 1, 2, 3, 4, etc, or Chinese numbers arranged in order, such as one, two, three, and four in Chinese, etc, or English letters arranged in order, such as A, B, C, D . . . or a, b, c, d . . . etc. Refer to FIG. 12, the target characters 120 are "1.", "2.", and "3.".

It should be noted that the reason for setting the preset number is that the target character usually appears in combination with one other character. Taking Arabic numerals as an example, the number 1 can be in the following format: "1", "(1)", "1)", "1.", etc. Therefore, the processor can detect a preset number of characters, and when only one character of the preset number of characters at the beginning of a line is sorted in order, it can be determined that at least one target character is obtained. The target character can also choose some other characters or character combinations with distinctive meanings, and the corresponding scheme falls within the scope of protection of the present disclosure.

In step 113, the processor can divide at least one row of handwriting corresponding to each of the at least one target character into a handwriting group, to obtain the at least one handwriting group. Considering that for each target character written by users, they usually continue to write one sentence or paragraph, for example, one sentence corresponds to one row, and one paragraph can correspond to multiple rows. Therefore, the processor can divide at least one row of handwriting corresponding to each of the at least one target character into a handwriting group, to obtain the at least one handwriting group. In this way, in this embodiment, dividing handwriting groups by the target character at the beginning of the row can improve the accuracy of the division.

In another example, the grouping figure includes at least one line. In step 82, the processor can group the information of handwriting based on the grouping figure to obtain at least one handwriting group, as shown in FIG. 13, including steps 131 to 133.

In step 131, the processor can divide the information of handwriting into rows, to obtain multiple handwriting rows. Dividing into rows can be implemented using the projection method in the above embodiments, which will not be further elaborated here. In step 132, in response to detecting at least one line exceeding the preset length in the display region of the smart handwriting display device, the processor can obtain the corresponding handwriting row for each line. After obtaining the line, the processor can determine the handwriting row corresponding to the line by determining whether there is an overlapping region between the line and the handwriting row. For example, users will draw at least one line within the display region to merge or split handwriting rows, such as drawing a connecting line between two handwriting rows to merge them, or drawing a line segment in the middle of a handwriting row to split the handwriting row, or drawing a horizontal line segment in the middle of a handwriting row to delete the handwriting row. Referring to FIG. 14, the upper image in FIG. 4 includes a line segment 140 between the two handwriting rows in the first row. In this case, the processor can merge these two handwriting rows into one handwriting row, resulting in the lower image in FIG. 14.

In step 133, in response to detecting that a line connects two handwriting rows, the processor can merge the two handwriting rows to obtain a handwriting group; in response to detecting that a line passes through a handwriting row, the processor can divide the handwriting row into two handwriting groups. In this way, in this example, merging and splitting handwriting rows through drawing lines can improve the accuracy of handwriting groups.

It should be noted that the above embodiments introduce different methods for obtaining handwriting groups. Without conflict, the above two or more schemes can be combined to form a new scheme, which also falls within the scope of protection of the present disclosure.

In step 14, pagination is performed on the at least one handwriting group, to obtain a respective subpage for each of the at least one handwriting group.

In this step, the subpages processed by pagination can be subpages that cannot be displayed at the same time, that is, after processing the handwriting groups within the main page, multiple subpages can be obtained, such that it can be switched from the main page to each subpage, but the main page and each subpage cannot be displayed at the same time. Alternatively, the subpages processed by pagination can be displayed simultaneously, that is, multiple subpages can be obtained by processing the handwriting groups within the main page, and then it can be switched from the main page to multiple subpages. In this case, multiple subpages can be displayed simultaneously, and users can choose to write within one or multiple subpages simultaneously.

In an example, the processor can perform pagination on at least one handwriting group, i.e., generate a subpage for each handwriting group to obtain the corresponding subpage for each handwriting group. It is understandable that in this example, the processor automatically creates the subpage corresponding to each handwriting group without the user's awareness, which can improve creation efficiency.

In an example, the smart handwriting display device allows users to manually paginate, and users can trigger the pagination control within the current page, as shown in FIG. 15, illustrating a triangular shaped pagination control. The processor can detect whether the pagination control is triggered. When the pagination control is detected to be triggered, in response to the detection of the pagination control being triggered, the processor can obtain the inputted pagination figure, such as the elliptical pagination figure 152 shown in FIG. 15, to obtain at least one pagination figure. The above pagination figure can be rectangular, circular, elliptical, or other shapes. The pagination figure can include serial numbers, such as "1", "2", and "3" in FIG. 15, which are the subpages of the same handwriting group. Then, the processor can paginate at least one handwriting group based on the pagination figure to obtain the corresponding subpage for each handwriting group.

It is understandable that during the handwriting process of each subpage, the subpage can be gradually moved based on the user's writing speed, clicking the up or left button, or the amount of content contained within the subpage, leaving more blank space for the ease of handwriting. As shown in FIG. 16, when the user writes content on the subpage and reaches the bottom edge of the display region by the fourth line, the effect is shown in the upper image of FIG. 16. In this case, the processor can move up the subpage, hiding the first line "XXXX", and move the second to fourth lines up to become the first to third lines, such that the fourth line is a blank line, allowing users to continue writing content in the fourth line with the effect shown in the lower image of FIG. 16. When the user clicks the save button, the processor can segment the final subpages to obtain multiple subpages of the same page size (such as A4). In this way, by setting the subpage for each handwriting group in this example, corresponding content can be written on each subpage, preventing the content of all handwriting groups from being concentrated on the same page, which is beneficial for improving the readability of meeting content and thus improving communication efficiency.

In an example, after determining the subpage corresponding to each handwriting group, the processor can generate a jump interface between the handwriting group and the subpage. In response to the jump interface being triggered, the processor can jump to the subpage corresponding to the handwriting group according to the display screen. The jump interface may include but is not limited to buttons, link addresses, or hyperlinks, as shown in FIG. 17, which illustrates buttons 172 and hyperlinks 171. It should be noted that the above jump interface can be set around each handwriting group, and can also be set at a designated position on the display screen (such as the bottom right corner). Taking the jump interface set in the bottom right corner as an example, the jump interface includes an up button, a down button, a subpage page number display region and a confirmation button. The subpage page number can be adjusted through the up button or the down button. When the target subpage is reached, it can jump to the target subpage when it is detected that the confirmation button is triggered.

The buttons are used to directly jump from the handwriting group to the subpage after being triggered. The link address is used to directly jump from the handwriting group to the subpage after being clicked. A hyperlink refers to the theme content becoming different forms (such as changing color, bolding, etc.), and when the handwriting group is clicked, it will jump to the subpage. It is understandable that technical personnel can choose appropriate jump methods based on specific scenarios, and the corresponding solutions fall within the scope of protection of the present disclosure.

In an example, after determining the subpage corresponding to each handwriting group, the user can write within that subpage. If only the subpage corresponding to the handwriting group appears, (handwriting) users may determine the handwriting group within a certain period of time when jumping to the subpage. As communication progresses, they may forget which handwriting group they are in. For users who only communicate but not write, they may not know the current handwriting group, which affects communication efficiency. Therefore, in this example, the processor can copy the handwriting of each handwriting group and paste the handwriting into the subpage corresponding to the handwriting group. Refer to FIG. 18, which shows multiple handwriting groups (182, 183, 184) displayed on the main page. After entering the subpage 181 corresponding to the first handwriting group, the processor can copy and paste the first handwriting group 182 into the subpage 181. In this example, the processor can also fix the handwriting group

182 to the upper left corner of subpage 181, making it convenient for users to write content in other blank regions. In this way, in this example, by copying and pasting the handwriting group onto the subpage, it is convenient for users to know the corresponding handwriting group on that subpage, thereby improving the efficiency of meeting communication. Moreover, this example can maintain the user's original handwriting, not only ensuring consistency in the handwriting of all content within the subpage, but also maintaining the user experience.

Figure 19:
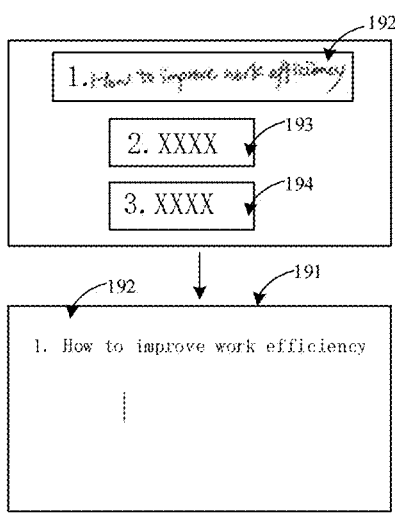
FIG. 19 is a flowchart for obtaining an extrinsic matrix of a monocular camera according to an exemplary embodiment.

In an example, after determining the subpage corresponding to each handwriting group, the user can write within that subpage. If only the subpage corresponding to the handwriting group appears, (handwriting) users may determine the handwriting group within a certain period of time when jumping to the subpage. As communication progresses, they may forget the handwriting group. For users who only communicate but not write, they may not know the handwriting group, which affects communication efficiency. Therefore, in this example, the processor can recognize the handwriting of each handwriting group to obtain text information. The processor can use neural networks such as CNN or RNN to recognize text information, which will not be repeated here. It is understandable that the above text information is standard text information, such as regular script, Song font, etc., rather than handwriting. Then, the processor can parse the text information into the subpage corresponding to the handwriting group. Referring to FIG. 19, the handwriting "How to improve work efficiency" in the upper image of FIG. 19 is recognized and converted into regular script "How to improve work efficiency". Then, the regular script "How to improve work efficiency" is pasted into the upper left corner of the lower image of the FIG. 19. In this way, in this example, by copying and pasting the handwriting group onto the subpage, it is convenient for users to know the corresponding handwriting group on that subpage, thereby improving the efficiency of meeting communication. Moreover, this example can convert handwriting into standard fonts, improving reading and communication efficiency.

Figure 20:
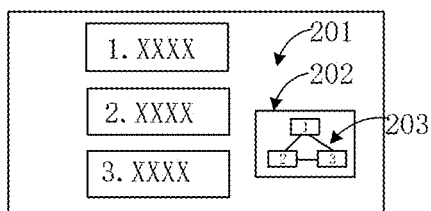
FIG. 20 is a schematic diagram for displaying a logical interface in a main page according to an exemplary embodiment.

It is understandable that after determining multiple handwriting groups and their corresponding subpages, users can navigate to each subpage through the main page (where all handwriting groups are located), allowing them to write the content of relevant handwriting groups within each subpage. Considering the parallel and progressive logical relationship between various handwriting groups, in order to facilitate users to clarify the above logical relationship, in this example, when there are multiple handwriting groups, the processor can obtain the logical relationship of multiple handwriting groups. Then, the processor can generate a logical interface for displaying the above logical relationship. Referring to FIG. 20, the main page 201 includes three handwriting groups, and the logical relationship between the three handwriting groups is a pairwise association. In this case, the processor can generate the logical interface 202, which includes the logical relationship 203.

Figure 21:
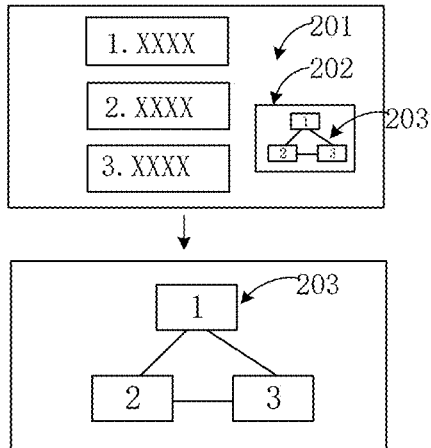
FIG. 21 is a schematic diagram for displaying a logical interface in full screen according to an exemplary embodiment.

In a scenario, during the process of the user writing handwriting groups on the main page, the processor can generate logical relationship and logical interface, and display them in a reduced manner in the blank space around the cursor. After the user finishes writing all the handwriting groups in the book, the processor can generate recommended logical relationship and display it in the logical interface. When the user confirms that the above logical relationship is correct, they can click on the above logical interface. When the logical interface is detected to be triggered, the processor can display the above logical interface in full screen, as shown in FIG. 21, making it convenient for users to analyze the conference from a global perspective.

Figure 22:
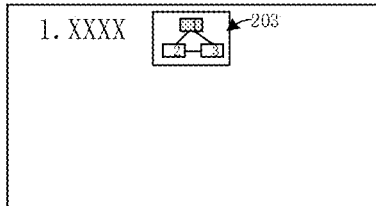
FIG. 22 is a schematic diagram for displaying a logical interface in a subpage according to an exemplary embodiment.

In another scenario, during the process of users writing the content of the handwriting group on the subpage, the processor can display the logical interface within each subpage. In this scenario, the logical interface can be displayed on the preset position of the subpage in a reduced-size manner, as shown in FIG. 22, such as behind or below the handwriting group, making it easier for users to determine the position of the handwriting group within all handwriting groups. In some examples, the processor can display the same handwriting group in the logical interface and the subpage in the same format, such as bold font, the same background color (such as green), the same font color (such as red), etc. As shown in FIG. 22, the first handwriting group is highlighted with a grayscale background color, making it easy for users to locate the same handwriting group in the logical interface at a glance and improving the viewing experience.

In this embodiment, the processor can obtain the logical relationship of multiple handwriting groups in different ways.

Figure 23:
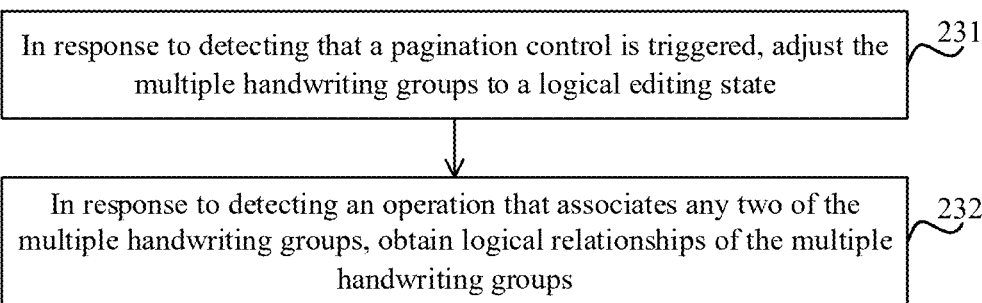
FIG. 23 is a flowchart for obtaining a logical relationship according to an exemplary embodiment.

In an example, as shown in FIG. 23, in step 231, the processor can detect whether a pagination control is triggered, which is displayed on the main page (containing all or part of the handwriting groups). When the above-mentioned pagination control is triggered, the processor can, in response to detecting that a pagination control is triggered, adjust the multiple handwriting groups to a logical editing state. The logical editing state can include but are not limited to stroke group jumping, flickering, dashed borders, etc., to distinguish them from non-editable handwriting groups.

In step 232, the processor can, in response to detecting an operation that associates any two of the multiple handwriting groups, obtain logical relationship of the multiple handwriting groups.

For example, the operation of associating two handwriting groups can be to draw a line to connect two handwriting groups, that is, to connect two handwriting groups with a line segment.

Figure 24:
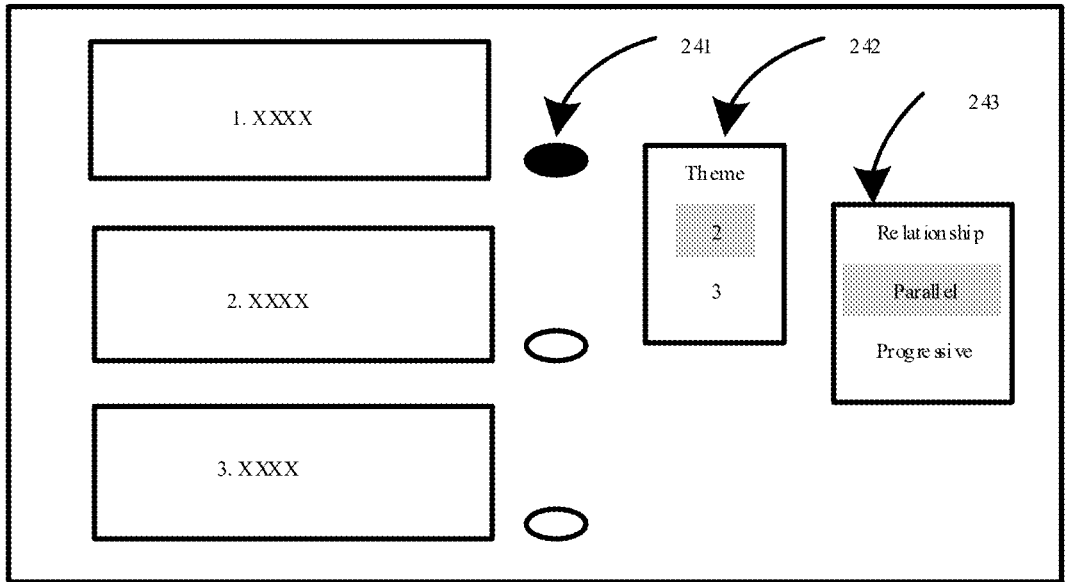
FIG. 24 is a schematic diagram of creating a logical relationship using a drop-down menu according to an exemplary embodiment.

For example, each handwriting group corresponds to a logical creation control that creates a logical relationship. When this logical creation control is clicked, it can display a drop-down menu that includes other handwriting groups. When selecting one of the handwriting groups, the next level dropdown menu can be displayed, which includes the logical relationship between the two handwriting groups (such as parallel, progressive, causal, etc.). Referring to FIG. 24, each group corresponds to a logic creation control 241. When this logic creation control 241 is triggered (if the logic creation control 241 of the first handwriting group turns black, it indicates that it is triggered), a drop-down menu 242 is displayed, which displays optional handwriting groups 2 and 3. When handwriting group 2 is selected, the next level dropdown menu 243 can be displayed, which displays the logical relationship between two handwriting groups. When parallel is selected, these two handwriting groups establish a parallel logical relationship.

Figure 25:
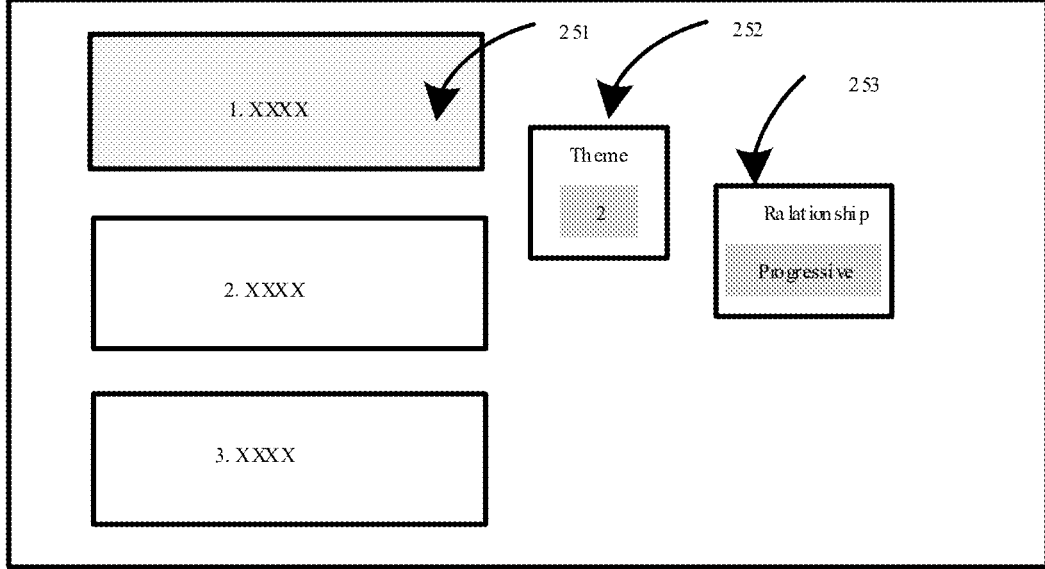
FIG. 25 is a schematic diagram of a display screen displaying a preset identifier according to an exemplary embodiment.

For example, when one of the handwriting groups is clicked, an input box can pop up, and users can input a handwriting group that have a logical relationship with that handwriting group. It is understandable that for the convenience of user input, the processor can temporarily number each handwriting group and delete the above temporary numbers after determining the logical relationship of all handwriting groups. After detecting the input of a handwriting group in the input box, the next input box can be displayed and placed behind the previous input box. The next input box is used to input a logical relationship between the two handwriting groups. Referring to FIG. 25, when clicking on the first handwriting group 251, an input box is displayed, and the number 2 can be entered to indicate the selection of handwriting group 2. Then, continue to display the next input box 253, where parallel can be entered, indicating that there is a logical relationship between handwriting groups 1 and 2 being parallel. Repeat the above operation to obtain the logical relationship between all handwriting groups. In this way, in this example, the user manually establishes the logical relationship of multiple handwriting groups, thereby obtaining the accurate logical relationship and improving the user's sense of participation.

In an example, after obtaining multiple handwriting groups, the user can manually establish the logical relationship between multiple handwriting groups. In this case, users can input a preset indicating sign in the handwriting application interface, i.e. the main page, to determine a relationship of at least two of the multiple handwriting groups corresponding to the preset indicating sign, to obtain the logical relationship of the multiple handwriting groups. The preset indicating sign can include at least one of a one-way arrow, a two-way arrow, a connecting line, a Chinese numeral, an Arabic numeral, an English letter, or a preset mnemonic. Referring to FIG. 26, the main page includes two preset indicating sign, namely the unidirectional arrow 261 and the bidirectional arrow 262. The unidirectional arrow 261 indicates that the first and second handwriting groups belong to a progressive relationship, and the bidirectional arrow 262 indicates that the second and third handwriting groups belong to a bidirectional parallel relationship.

The English letters can be used in order (such as A, B, C, D . . . ) or in the order of certain words (such as SWOT). The preset mnemonic can include characters in certain units (such as S, W, O, and T in SWOT), and J11, J22, and J33 represent the first element in the first layer of the pyramid, the second element in the second layer, and the third element in the third layer, respectively. The processor can, in response to detecting a preset indicating sign inputted by the user in the handwriting application interface, determine a relationship of at least two of the multiple handwriting groups corresponding to the preset indicating sign, to obtain the logical relationship of the multiple handwriting groups.

In an example, the processor obtains the logical relationship of multiple handwriting groups, as shown in FIG. 27, including steps 271 to 273. In step 271, the processor can obtain location data of the multiple handwriting groups. The location data of the handwriting group can be the coordinate position of the center point or the coordinate position of a corner point (up, down, left, right, center), which can be set according to specific scenes. In step 272, the processor can generate relative position relationships of multiple handwriting groups based on the location data. The relative position relationship includes at least one of surround, up and down, left and right, star, triangle, rectangle, pyramid, or tree. In step 273, the processor can determine a logical relationship in a preset logical relationship library that matches the relative position relationship as the logical relationship of the multiple handwriting groups. The preset logical relationship library includes several preset logical relationships, each of which includes a unique logical relationship corresponding to a certain number of handwriting groups. In other words, even if the number of handwriting groups is the same, they can correspond to different logical relationships. Referring to FIG. 28, the location data of the three handwriting groups are positions 281, 282, and 283, respectively. The processor can match the logical relationship 284 of the three positions belonging to triangles based on the positions 281, 282, and 283 mentioned above. In this way, in this embodiment, the logical relationship of handwriting groups is determined through location data, which is suitable for scenarios where users write handwriting in different positions and improves the accuracy of the logical relationship.

It is understandable that when there are more handwriting groups, the processor determines more logical relationships. In this case, the processor can obtain recommended chart templates based on the above logical relationships, as shown in FIG. 29, which illustrates the effects of four recommended chart templates from left to right, making it easier for users to choose the target template. Then, the processor can, in response to selecting a recommended chart template, generate a logical relationship.

Figure 30:
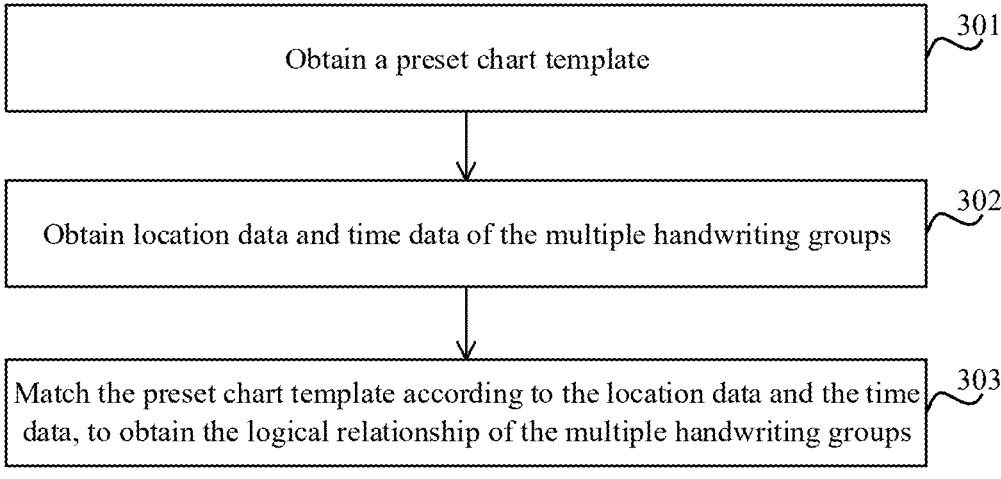
FIG. 30 is a flowchart for obtaining a logical relationship of multiple handwriting groups according to an exemplary embodiment.

In an example, the processor obtains the logical relationships of multiple handwriting groups, as shown in FIG. 30, including steps 301 to 303.

In step 301, the processor can obtain a preset chart template. The preset chart template can be selected by the user before writing the handwriting group, during the handwriting process of the handwriting group, or after writing all the handwriting groups. In step 302, the processor can obtain position data and time data of the multiple handwriting groups. The location data of the handwriting group can be the position of the center point, and the time data can be the time of the center point. In step 303, the processor can match the preset chart template with the position data and the time data, to obtain the logical relationship of the multiple handwriting groups. The preset chart template mentioned above can be found in the recommended chart templates shown in FIG. 29.

In some embodiments, the processor may determine the logical relationship of multiple handwriting groups based on partition figure. For example, when the partition graphic is in a cross shape, the handwriting groups can be divided into the logical relationship corresponding to the SWOT template. Users can set the above partition figure as needed, such as triangles, rings, pyramids, trees, etc., to determine the logical relationship of multiple handwriting groups, which is beneficial for improving the efficiency of determining logical relationships.

Considering that users have a need to output discussion plans after the meeting is completed, the relevant technology can only output meeting plans in image format, which requires users to re-enter the content. In this embodiment, the processor can the subpage corresponding to each of the at least one handwriting group, to obtain a multimedia file in a designated format. This multimedia file can include but is not limited to office files (such as Word, PPT, visio), images, web pages, or videos. Taking PPT files as an example, the processor can generate them in order of the main page, logical interface, subpage of the first handwriting group, subpage of the second handwriting group, etc., making it convenient for users to modify content, copy content, adjust layout, etc., which is beneficial for improving processing efficiency and forming the final file to accelerate the implementation of meeting plans.

In an example, when the multimedia file in the designated format is a Word file, the processor processing the subpage corresponding to each of the at least one handwriting group includes: the processor can create a Word blank document. Then, the processor can insert content of each of the at least one handwriting group and content of the subpage of each of the at least one handwriting group into the blank Word document, to obtain a target Word file. In this way, the meeting content will be output as the target Word file in this example, without the need to re-enter it, making it convenient for users to process the file later.

In an example, when the multimedia file in the designated format is a web file, the processor processing the subpage corresponding to each of the at least one handwriting group includes: the processor can set the parameters of the web template based on each handwriting group. Then, the processor can insert content of the subpage corresponding to each of the at least one handwriting group into a corresponding location of the webpage template, to obtain a target webpage file. In this way, the meeting content will be output as a target webpage file in this example, without the need to re-enter, and can be directly displayed on relevant websites, achieving the effect of timely synchronization of meeting content.

Considering that some existing files may be opened during the meeting, users can delete the existing files during the discussion process. For example, if a smart handwriting display device displays a Word file, and users need to modify the Word file on the smart handwriting display device, since the existing file is shared by other devices (such as screen mirroring), it is not possible to directly modify the existing file. Therefore, in an example, auxiliary software can be preset in the smart handwriting display device, which can operate the controls of the current page, during the display of the current page, the processor can obtain a new element. In response to detecting that the insertion control on the current page is operated by the auxiliary software, the processor can insert a new element into the current page. Afterwards, in response to detecting the alignment control on the current page, the processor can align the content within the current page. In this way, in this example, new elements can be inserted into existing files to improve processing efficiency. It can be understood that the above embodiment describes a scheme for inserting new elements, modifying and deleting operations. The auxiliary software operates corresponding controls to modify or delete the content of existing files.

In an example, after the meeting is completed, the user can select a preset template from the template library. In response to detecting the input preset template, the processor can match the content corresponding to each handwriting group to the aforementioned preset template. For example, if the preset template is a binary tree, the processor can place the main page at the root node of the binary tree, and then place each handwriting group at the child node of the binary tree, and afterwards, place the content of each handwriting group in the leaf child node of the binary tree, and finally output a multimedia file. In this way, by processing the meeting content in this example, the workload of subsequent processing of the meeting content can be reduced or even eliminated.

It should be noted that in the various embodiments described in the present disclosure, the scheme provided in the present disclosure can obtain information of handwriting of uses; then, determine at least one handwriting group corresponding to the information of handwriting; finally, paginate at least one handwriting group to obtain the corresponding subpage for each handwriting group. In this way, the embodiments write the content of each handwriting group on the corresponding subpage, such that the content of different handwriting groups is isolated from each other, achieving the effect of keeping the display region clean and tidy, which is conducive to improving communication efficiency.

In the embodiments, a smart handwriting display method is further provided, applied to a smart handwriting display device, where the smart handwriting display device includes a display and a processor, and the smart handwriting display method includes:

control the display to display a handwriting application interface;

obtaining information of handwriting of a user and controlling the handwriting application interface to display the handwriting;

determining at least one handwriting group corresponding to the information of handwriting, where each of the at least one handwriting group includes at least one handwriting; and performing pagination on the at least one handwriting group, to obtain a respective subpage for each of the at least one handwriting group.

In some embodiments, the information of handwriting includes at least one of a data set of trajectory points, a data set of touch points, or a data set of pixel points.

In some embodiments, the data set of touch points includes at least one of original touch point data, interpolated touch point data, or sparsely sampled touch point data; and the data set of pixel points includes at least one of linewidth-adjusted pixel data or stroke-fitted pixel data.

In some embodiments, determining the at least one handwriting group corresponding to the information of handwriting includes:

grouping the information of handwriting to obtain the at least one handwriting group.

In some embodiments, grouping the information of handwriting includes automatically grouping the information of handwriting.

In some embodiments, grouping the information of handwriting to obtain the at least one handwriting group includes:

projecting the information of handwriting onto at least one coordinate axis to obtain a projection histogram;

determining a separation location on each of the at least one coordinate axis according to peaks and valleys of the projection histogram; and generating a separation line according to the separation location of each of the at least one coordinate axis, to obtain the at least one handwriting group.

In some embodiments, grouping the information of handwriting to obtain the at least one handwriting group includes:

clustering handwriting points in the information of handwriting, to obtain a category to which each of the handwriting points belongs and multiple category centers; and determining handwriting points of one category as a handwriting group, to obtain the at least one handwriting group.

In some embodiments, the clustering method includes a density-based clustering algorithm or a spectral clustering algorithm.

In some embodiments, grouping the information of handwriting to obtain the at least one handwriting group includes:

obtaining strokes from the information of handwriting; and clustering each of the strokes in the information of handwriting, to obtain the at least one handwriting group.

In some embodiments, grouping the information of handwriting to obtain the at least one handwriting group includes:

dividing the information of handwriting into rows, to obtain multiple handwriting rows; and clustering the multiple handwriting rows, to obtain the at least one handwriting group.

In some embodiments, after dividing the information of handwriting into rows, to obtain the multiple handwriting rows, the method further includes:

in response to detecting that a handwriting row of the multiple handwriting rows is dragged to a region where another handwriting row are located, merging the two handwriting rows.

In some embodiments, clustering the multiple handwriting rows, to obtain the at least one handwriting group includes:

in a case where the at least one handwriting group includes multiple handwriting groups, in response to detecting that a handwriting group of the multiple handwriting groups is dragged to a region where another handwriting group are located, merging the two handwriting groups, to obtain the at least one handwriting group.

In some embodiments, grouping the information of handwriting includes grouping the information of handwriting in response to a drawn grouping figure.

In some embodiments, grouping the information of handwriting to obtain the at least one handwriting group includes:

in response to detection of the grouping figure in the handwriting application interface, grouping the information of handwriting according to the grouping figure to obtain the at least one handwriting group.

In some embodiments, the grouping figure includes a line, and grouping the information of handwriting according to the grouping figure to obtain the at least one handwriting group includes:

obtaining at least one line exceeding a preset length in the handwriting application interface; and dividing the information of handwriting according to the at least one line, to obtain the at least one handwriting group.

In some embodiments, the grouping figure includes a target character, and grouping the information of handwriting according to the grouping figure to obtain the at least one handwriting group includes:

grouping the information of handwriting according to a position relationship between the target character and the handwriting, to obtain the at least one handwriting group.

In some embodiments, grouping the information of handwriting according to the position relationship between the target character and the handwriting, to obtain the at least one handwriting group includes:

identifying the information of handwriting to obtain text information corresponding to the information of handwriting;

obtaining a preset number of characters at beginnings of rows in the text information, to obtain at least one target character that meets a preset rule; and dividing at least one row of handwriting corresponding to each of the at least one target character into a handwriting group, to obtain the at least one handwriting group.

In some embodiments, the grouping figure includes a line, and grouping the information of handwriting according to the grouping figure to obtain the at least one handwriting group includes:

dividing the information of handwriting into rows, to obtain multiple handwriting rows; and in response to detecting at least one line exceeding a preset length in the handwriting application interface, obtaining a respective row of handwriting corresponding to each of the at least one line;

in response to detecting that a line connects two handwriting rows, merging the two handwriting rows to obtain a handwriting group; in response to detecting that a line passes through a handwriting row, dividing the handwriting row into two handwriting groups.

In some embodiments, the grouping figure is hand drawn.

In some embodiments, the method further includes:

generating a jump interface between a handwriting group and a subpage, where the jump interface includes at least one of a button, a link address, or a hyperlink; and in response to the jump interface being triggered, jumping to the subpage corresponding to the handwriting group.

In some embodiments, performing the pagination processing on the at least one handwriting group, to obtain the subpage corresponding to each of the at least one handwriting group includes:

for each of the at least one handwriting group, copying a handwriting of the handwriting group; and pasting the handwriting into the subpage corresponding to the handwriting group.

In some embodiments, performing the pagination processing on the at least one handwriting group, to obtain the subpage corresponding to each of the at least one handwriting group includes:

for each of the at least one handwriting group, identifying the handwriting of the handwriting group and obtain text information; and pasting the text information into the subpage corresponding to the handwriting group.

In some embodiments, performing the pagination processing on the at least one handwriting group, to obtain the subpage corresponding to each of the at least one handwriting group includes:

in response to detecting that a pagination control is triggered, obtaining an inputted pagination figure; and performing the pagination on the at least one handwriting group according to the pagination figure, to obtain the subpage corresponding to each of the at least one handwriting group.

In some embodiments, the method further includes:

in a case where the at least one handwriting group includes multiple handwriting groups, obtaining a logical relationship of the multiple handwriting groups; and generating a logical interface for displaying the logical relationship.

In some embodiments, the logical interface is configured to display in a main page or display in a reduced manner in a subpage.

In some embodiments, obtaining the logical relationship of the multiple handwriting groups includes:

in response to detecting that a pagination control is triggered, adjusting the multiple handwriting groups to a logical editing state; and in response to detecting an operation that associates any two of the multiple handwriting groups, obtaining the logical relationship of the multiple handwriting groups.

In some embodiments, obtaining the logical relationship of the multiple handwriting groups includes:

in response to detecting a preset indicating sign inputted by the user in the handwriting application interface, determining a relationship of at least two of the multiple handwriting groups corresponding to the preset indicating sign, to obtain the logical relationship of the multiple handwriting groups;

where the preset indicating sign includes at least one of a one-way arrow, a two-way arrow, a connecting line, a Chinese numeral, an Arabic numeral, an English letter, or a preset mnemonic.

In some embodiments, obtaining the logical relationship of the multiple handwriting groups includes:

obtaining location data of the multiple handwriting groups;

generating a relative position relationship of the multiple handwriting groups according to the location data, where the relative position relationship includes at least one of surround, up and down, left and right, star, triangle, rectangle, pyramid, or tree; and determining a logical relationship in a preset logical relationship library that matches the relative position relationship as the logical relationship of the multiple handwriting groups.

In some embodiments, the method further includes:

obtaining a recommended chart template according to the logical relationship; and in response to selecting a recommended chart template, generating a logical relationship.

In some embodiments, obtaining the logical relationship of the multiple handwriting groups includes:

obtaining a preset chart template;

obtaining location data and time data of the multiple handwriting groups; and matching the preset chart template with the location data and the time data, to obtain the logical relationship of the multiple handwriting groups.

In some embodiments, the method further includes:

determining a logical relationship of the at least one handwriting group according to a partition figure.

In some embodiments, the method further includes:

processing the subpage corresponding to each of the at least one handwriting group, to obtain a multimedia file in a designated format.

In some embodiments, the method further includes:

in response to detecting an input preset template, matching content corresponding to each of the at least one handwriting group to the preset template, to obtain a multimedia file.

In some embodiments, the multimedia file in the designated format is a webpage file, and processing the subpage corresponding to each of the at least one handwriting group includes:

creating a blank Word document; and inserting content of each of the at least one handwriting group and content of the subpage of each of the at least one handwriting group into the blank Word document, to obtain a target Word file.

In some embodiments, the multimedia file in the designated format is a webpage file, and processing the subpage corresponding to each of the at least one handwriting group, to obtain the multimedia file in the designated format includes:

setting parameters of a webpage template based on each of the at least one handwriting group; and inserting content of the subpage corresponding to each of the at least one handwriting group into a corresponding location of the webpage template, to obtain a target webpage file.

In some embodiments, the method further includes:

obtaining a new element during a process of displaying the handwriting application interface;

in response to detecting that an insertion control of the handwriting application interface is operated through auxiliary software, inserting the new element into the handwriting application interface; and in response to detecting that an alignment control of the handwriting application interface is operated through auxiliary software, aligning content in the handwriting application interface.

In the embodiments, a smart handwriting display apparatus is further provided, applied to a smart handwriting display device, where the smart handwriting display device includes a display and a processor, and the smart handwriting display apparatus includes:

a handwriting interface display module, configured to control the display to display a handwriting application interface;

a handwriting display module, configured to obtain information of handwriting of a user and control the handwriting application interface to display the handwriting;

a handwriting group determining module, configured to determine at least one handwriting group corresponding to the information of handwriting, where each of the at least one handwriting group includes at least one handwriting; and a handwriting group pagination module, configured to perform pagination on the at least one handwriting group, to obtain a respective subpage for each of the at least one handwriting group.

In the embodiments, an electronic device is further provided, and includes:

an inputter;

a display;

one or more processors;

one or more memories for storing a computer program that can be executed by the one or more processors;

where the one or more processors are configured to execute computer programs in the one or more memory to implement the method mentioned above.

In embodiments, a computer-readable storage medium is further provided, such as a memory including executable computer programs that can be executed by a processor to implement the method of the above embodiments. The readable storage medium may be a Read-Only Memory (ROM), a Random Access Memory (RAM), a CD-ROM, a magnetic tape, a floppy disk and an optical data storage device, etc.

After considering and practicing the disclosure of the specification, other embodiments of the present disclosure will be readily apparent to those skilled in the art. The present disclosure is intended to cover any modification, use or adaptation of the present disclosure. These modifications, uses or adaptations follow the general principles of the present disclosure and include common knowledge and conventional technical means in the technical field that are not disclosed in the present disclosure. The specification and embodiments herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A device, comprising a display and one or more processors, wherein the one or more processors are configured to:

control the display to display a handwriting application interface;

obtain information of handwriting of a user and control the handwriting application interface to display the handwriting;

determine at least one handwriting group corresponding to the information of handwriting, wherein each of the at least one handwriting group comprises at least one handwriting; and perform pagination on the at least one handwriting group, to obtain a respective subpage for each of the at least one handwriting group;

wherein the one or more processors are configured to:

in response to detection of a grouping figure in the handwriting application interface, group the information of handwriting according to the grouping figure to obtain the at least one handwriting group;

wherein the grouping figure comprises a line, and the one or more processors are configured to:

obtain at least one line exceeding a preset length in the handwriting application interface; and divide the information of handwriting according to the at least one line, to obtain the at least one handwriting group.

2. The device according to claim 1, further comprising an inputter, and the inputter is connected to the one or more processors, wherein the one or more processors are configured to:

obtain input data transmitted by the inputter, and determine the information of handwriting according to the input data.

3. The device according to claim 2, wherein the inputter comprises a touch component, wherein the one or more processors are configured to:

in response to a touch operation of the user, obtain a data set of touch points collected by the touch component on a current page, to obtain the input data.

4. The device according to claim 2, wherein the inputter comprises a locator, wherein the one or more processors are configured to:

receive a data set of handwriting trajectory points collected by the locator, and obtain the input data according to the data set of handwriting trajectory points.

5. The device according to claim 2, wherein the inputter comprises a communication component, and the communication component is connected to the one or more processors, wherein the one or more processors are configured to:

obtain a data set of touch points or data of handwriting image transmitted by a remote device through the communication component, to obtain the input data.

6. The device according to claim 1, wherein the information of handwriting comprises a data set of trajectory points, a data set of touch points, a data set of pixel points, or any combination thereof, the data set of touch points comprises original touch point data, interpolated touch point data, sparsely sampled touch point data, or any combination thereof; and the data set of pixel points comprises linewidth-adjusted pixel data, stroke-fitted pixel data or both.

7. The device according to claim 1, wherein the one or more processors are configured to:

project the information of handwriting onto at least one coordinate axis to obtain a projection histogram; determine a separation location on each of the at least one coordinate axis according to peaks and valleys of the projection histogram; and generate a separation line according to the separation location of each of the at least one coordinate axis, to obtain the at least one handwriting group; or cluster handwriting points in the information of handwriting, to obtain a category to which each of the handwriting points belongs and multiple category centers; and determine handwriting points of one category as a handwriting group, to obtain the at least one handwriting group; or obtain strokes from the information of handwriting; and cluster each of the strokes in the information of handwriting, to obtain the at least one handwriting group.

8. The device according to claim 1, wherein the one or more processors are configured to:

divide the information of handwriting into rows, to obtain multiple handwriting rows; and cluster the multiple handwriting rows, to obtain the at least one handwriting group.

9. The device according to claim 8, wherein the one or more processors are configured to:

in response to detecting that a handwriting row of the multiple handwriting rows is dragged to a region where another handwriting row are located, merge the two handwriting rows; or wherein the at least one handwriting group comprises multiple handwriting groups, in response to detecting that a handwriting group of the multiple handwriting groups is dragged to a region where another handwriting group are located, merge the two handwriting groups, to obtain the at least one handwriting group.

10. The device according to claim 1, wherein the one or more processors are configured to:

for each of the at least one handwriting group, copy a handwriting of the handwriting group; and paste the handwriting into the subpage corresponding to the handwriting group; or for each of the at least one handwriting group, identify the handwriting of the handwriting group and obtain text information; and paste the text information into the subpage corresponding to the handwriting group; or in response to detecting that a pagination control is triggered, obtain an inputted pagination figure; and perform the pagination on the at least one handwriting group according to the pagination figure, to obtain the subpage corresponding to each of the at least one handwriting group.

11. The device according to claim 1, wherein the at least one handwriting group comprises multiple handwriting groups, and the one or more processors are further configured to:

obtain a logical relationship of the multiple handwriting groups; and generate a logical interface for displaying the logical relationship;

wherein the logical interface is configured to display in a main page or display in a reduced manner in a subpage.

12. The device according to claim 11, wherein the one or more processors are configured to:

in response to detecting that a pagination control is triggered, adjust the multiple handwriting groups to a logical editing state; and in response to detecting an operation that associates any two of the multiple handwriting groups, obtain a logical relationship of the multiple handwriting groups; or in response to detecting a preset indicating sign inputted by the user in the handwriting application interface, determine a relationship of at least two of the multiple handwriting groups corresponding to the preset indicating sign, to obtain the logical relationship of the multiple handwriting groups; wherein the preset indicating sign comprises at least one of a one-way arrow, a two-way arrow, a connecting line, a Chinese numeral, an Arabic numeral, an English letter, or a preset mnemonic; or obtain location data of the multiple handwriting groups; generate a relative position relationship of the multiple handwriting groups according to the location data, wherein the relative position relationship comprises at least one of surround, up and down, left and right, star, triangle, rectangle, pyramid, or tree; and determine a logical relationship in a preset logical relationship library that matches the relative position relationship as the logical relationship of the multiple handwriting groups; or obtain a preset chart template; obtain location data and time data of the multiple handwriting groups; and match the preset chart template with the location data and the time data, to obtain the logical relationship of the multiple handwriting groups.

13. The device according to claim 1, wherein the one or more processors are further configured to:

process the subpage corresponding to each of the at least one handwriting group, to obtain a multimedia file in a designated format; wherein the one or more processors are configured to: create a blank document; and insert content of each of the at least one handwriting group and content of the subpage of each of the at least one handwriting group into the blank document; or the one or more processors are configured to: set parameters of a webpage template based on each of the at least one handwriting group; and insert content of the subpage corresponding to each of the at least one handwriting group into a corresponding location of the webpage template.

14. The device according to claim 1, wherein the one or more processors are further configured to:

obtain a new element during a process of displaying the handwriting application interface;

in response to detecting that an insertion control of the handwriting application interface is operated through an auxiliary software, insert the new element into the handwriting application interface; and in response to detecting that an alignment control of the handwriting application interface is operated through an auxiliary software, align content in the handwriting application interface.

15. A method of operating the device of claim 1, comprising:

controlling the display to display a handwriting application interface;

obtaining information of handwriting of a user and controlling the handwriting application interface to display the handwriting;

determining at least one handwriting group corresponding to the information of handwriting, wherein each of the at least one handwriting group comprises at least one handwriting; and performing pagination on the at least one handwriting group, to obtain a respective subpage for each of the at least one handwriting group.

16. A non-transitory computer-readable storage medium, wherein when an executable computer program in the non-transitory computer-readable storage medium is executed by a processor, the method according to claim 15 is implemented.

17. A device, comprising a display and one or more processors, wherein the one or more processors are configured to:

control the display to display a handwriting application interface;

obtain information of handwriting of a user and control the handwriting application interface to display the handwriting;

determine at least one handwriting group corresponding to the information of handwriting, wherein each of the at least one handwriting group comprises at least one handwriting; and perform pagination on the at least one handwriting group, to obtain a respective subpage for each of the at least one handwriting group;

wherein the one or more processors are configured to:

in response to detection of a grouping figure in the handwriting application interface, group the information of handwriting according to the grouping figure to obtain the at least one handwriting group;

wherein the grouping figure comprises a target character, and the one or more processors are configured to:

identify the information of handwriting to obtain text information corresponding to the information of handwriting;

obtain a preset number of characters at beginnings of rows in the text information, to obtain at least one target character that meets a preset rule; and divide at least one row of handwriting corresponding to each of the at least one target character into a handwriting group, to obtain the at least one handwriting group.

18. A device, comprising a display and one or more processors, wherein the one or more processors are configured to:

control the display to display a handwriting application interface;

obtain information of handwriting of a user and control the handwriting application interface to display the handwriting;

determine at least one handwriting group corresponding to the information of handwriting, wherein each of the at least one handwriting group comprises at least one handwriting; and perform pagination on the at least one handwriting group, to obtain a respective subpage for each of the at least one handwriting group;

wherein the one or more processors are configured to:

in response to detection of a grouping figure in the handwriting application interface, group the information of handwriting according to the grouping figure to obtain the at least one handwriting group;

wherein the grouping figure comprises a line, and the one or more processors are configured to:

divide the information of handwriting into rows, to obtain multiple handwriting rows; and in response to detecting at least one line exceeding a preset length in the handwriting application interface, obtain a respective row of handwriting corresponding to each of the at least one line;

in response to detecting that a line connects two handwriting rows, merge the two handwriting rows to obtain a handwriting group; and in response to detecting that a line passes through a handwriting row, divide the handwriting row into two handwriting groups.

\* \* \* \* \*